United States Patent
Vashisht et al.

(10) Patent No.: US 7,480,260 B1
(45) Date of Patent: Jan. 20, 2009

(54) METHOD AND APPARATUS FOR IMPLEMENTING A PRESENCE-BASED UNIVERSAL CAMP-ON FEATURE IN PACKET-BASED TELEPHONY SYSTEMS

(75) Inventors: Vikas Vashisht, Naperville, IL (US); Anoop Tripathi, Lake Zurich, IL (US); Jaideep Abichandani, Carol Stream, IL (US); Hui Dai, Itasca, IL (US)

(73) Assignee: 3Com Corporation, Marlborough, MA (US)

( * ) Notice: Subject to any disclaimer, the term of this patent is extended or adjusted under 35 U.S.C. 154(b) by 840 days.

(21) Appl. No.: 10/845,382

(22) Filed: May 13, 2004

(51) Int. Cl.
*H04L 12/66* (2006.01)
*H04M 3/42* (2006.01)

(52) U.S. Cl. .................. 370/260; 370/271; 370/352; 370/209.01

(58) Field of Classification Search .......... None
See application file for complete search history.

(56) References Cited

U.S. PATENT DOCUMENTS

| | | | | |
|---|---|---|---|---|
| 5,268,957 | A * | 12/1993 | Albrecht | 379/209.01 |
| 6,363,065 | B1 * | 3/2002 | Thornton et al. | 370/352 |
| 6,665,293 | B2 * | 12/2003 | Thornton et al. | 370/352 |
| 7,065,197 | B1 * | 6/2006 | Ramella-Pezza et al. | 379/201.02 |
| 7,218,722 | B1 * | 5/2007 | Turner et al. | 379/221.02 |
| 7,280,530 | B2 * | 10/2007 | Chang et al. | 370/352 |
| 2005/0123114 | A1 * | 6/2005 | Trandal et al. | 379/201.01 |

OTHER PUBLICATIONS

Sinnreich, Henry et al., *Delivering VoIP and Multimedia Services With Session Initiation Protocol*, pp. 80-82, 168-169 (Wiley 2001).

* cited by examiner

*Primary Examiner*—Chi H. Pham
*Assistant Examiner*—Soon D. Hyun
(74) *Attorney, Agent, or Firm*—McDonnell Boehnen Hulbert & Berghoff LLP

(57) ABSTRACT

A method and apparatus for implementing a presence based universal camp-on feature in packet-based telephony systems are disclosed. A first packet-based device is subscribed to a line status of a second packet-based device. A first notification is received into the first packet-based device from the second packet-based device when the line status of the second packet-based device is in a busy state. A second notification is received into the first packet-based device from the second packet-based device when the line status of the second packet-based device is in an idle state. A user of the first packet-based device is prompted with an option to establish a communication session with the second packet-based device upon receiving the second notification into the first packet-based device. A communication session is established between the first packet-based device and the second packet-based device in response to receiving an accept-call command into the first packet-based device. The first packet-based device and the second packet-based device may be packet-based telephones, such as Session Initiation Protocol (SIP) telephones.

46 Claims, 11 Drawing Sheets

METHOD AND APPARATUS FOR IMPLEMENTING A PRESENCE-BASED UNIVERSAL CAMP-ON FEATURE IN PACKET-BASED TELEPHONY SYSTEMS

BACKGROUND OF THE INVENTION

1. Field of the Invention

The present invention is related to Internet Protocol (IP) telephony systems, and more particularly, to a method and apparatus of implementing a presence-based universal camp-on feature in IP telephony systems using Session Initiation Protocol (SIP) messages.

2. Description of Related Art

Since the invention of the telephone well over one hundred years ago, the prevalence and pervasiveness of telephone use and the importance of telephones to our society has continued to grow. For the vast majority of that time period, users have used conventional, circuit-switched telephones, communicating over the Public Switched Telephone Network (PSTN). Eventually, Private Branch Exchange (PBX) systems were developed to service the needs of, in particular, businesses with many employees, each having their own telephone. PBX systems typically include a central entity, which acts as an internal switching mechanism, connecting callers within an office system to each other, and to the PSTN via "outside lines".

PBX systems are typically set up such that a "front desk" or reception location on the system may be accessed by outside callers (via the PSTN) using a particular "general" phone number, such as (555) 555-1000. Each user within the PBX system (such as each employee of the company), would have assigned to them a similar phone number, such as (555) 555-1234. An outside caller calling this latter number would be routed by the central entity to the telephone associated with the "1234" extension. And each user would have such an extension.

Within PBX systems, certain additional features have been developed. For example, a "caller ID" feature has been implemented, whereby when a user having an extension such as 1234 calls another user on the system having extension such as 5678, the called party's telephone may display "1234" as the calling extension, along with the calling party's name, on a display of the telephone. To accommodate such features, telephones have been developed specifically for PBX implementations. These telephones typically have a display, such as an LCD, as well as a number of buttons designed to correspond to a number of provided features.

Another such feature that has been developed for PBX systems is a "camp" or "camp-on" features. The camp-on feature may be implemented as follows: user 1234 calls user 5678, who does not answer. Perhaps while the phone is ringing or in response to receiving a busy signal or an indication that user 5678 is on another line, user 1234 invokes the camp-on feature by, for example, pressing a "CAMP" button on his or her PBX phone. When user 5678 ends his or her current call (if that user was on a call), a message may appear on the LCD of user 5678's PBX phone, such as "Call J. Doe at extension 1234."

In approximately the last decade, the pervasiveness and popularity of the Internet has risen dramatically. More people than ever are online, and the number only grows. Along with the meteoric rise of the Internet has come the development of Internet telephony, also known as IP (Internet Protocol) telephony, or VoIP (Voice over IP). In IP telephony, a device known as a packet-based telephone will convert a user's audible inputs (such as spoken words) to digital data, which is then packetized, or broken into multiple packets, and transmitted using the Internet Protocol. Incoming data is arranged in the proper sequence, and the packet-based telephone converts this data to analog sounds, and plays them for the user. If one user is using a VoIP phone and the other party is using a conventional phone connected to the PSTN, a gateway server will manage the conversion between the two types of data transmission.

Along with the development of the Internet and IP telephony, a protocol called Session Initiation Protocol, or SIP, has developed. SIP is a protocol useful for transmitting short messages between entities connected via one or more data networks, and is primarily used to set up, or initiate, media or communication sessions between entities. SIP operates on a request-response model similar to HTTP. For example, a communication session may be set up between two entities by the first entity sending the second entity a SIP "INVITE" request. SIP requests may also be referred to as SIP methods. The second entity may transmit to the first entity a "200 OK" response. When this response is acknowledged by the first entity transmitting an "ACK" message to the second entity, the communication session may then be established. In many implementations, a server known as a "SIP proxy" maintains information about which users are currently logged in to the system and how those users may be contacted, and facilitates messaging by forwarding messages from sender to recipient, among other functions.

SIP responses are typically associated with a number, which places the response in a class of responses. Responses of the form "1xx" ("180 Ringing") are known as provisional or informational responses, and generally indicate that the request is progressing but is not yet complete. "2xx" responses ("200 OK") indicate success (that the request has completed successfully). "3xx" responses ("302 Moved Temporarily") indicate redirection, meaning that the requesting party should send the request to another location. "4xx" responses ("486 Busy Here"), "5xx" responses ("503 Service Unavailable"), and "6xx" responses ("603 Decline") indicate that some type of error or failure has occurred.

SIP also provides for what is known as event subscription and notification. For example, one SIP entity, such as a SIP-enabled packet-based telephone (or SIP phone) may send a SUBSCRIBE request to a second SIP phone, requesting a subscription to a certain parameter of the second SIP phone. If the second SIP phone accepts the subscription, it will transmit both a "200 OK" response and a NOTIFY request to the first SIP phone. The "200 OK" response indicates success of the SUBSCRIBE request, while the NOTIFY request will give the first SIP phone an immediate report as to the status of the subscribed-to parameter. For as long as that subscription lasts (which may be specified using an "Expires" field in the original SUBSCRIBE request), the second SIP phone will transmit a NOTIFY request to the first SIP phone each time the value of the subscribed-to parameter changes. Each NOTIFY request will result in the first SIP phone transmitting a response to the second SIP phone, usually "200 OK".

The development of SIP phones has enabled the development of a number of telephony features using SIP messaging. An "automatic callback" feature has been developed, whereby a first SIP phone calls a second SIP phone, which happens to be in a busy state at the time the call is placed. The first SIP phone then sends a SUBSCRIBE request to the second SIP phone, requesting notification when the second SIP phone becomes available for a communication session.

When the second SIP phone becomes available, it sends a NOTIFY request to the first SIP phone. The first SIP phone then automatically places another call to the second SIP phone.

This "automatic callback" feature has drawbacks. For example, the user of the first SIP phone may not be present at the first SIP phone when the automatic call is placed, which is triggered only by the present SIP phone becoming available. Perhaps the user of the first SIP phone has left the office for the day. This results in a confusing scenario where the user of the second SIP phone picks up the phone and hears ringing instead of hearing a calling party, as would typically be the case. This "ring back" tone is undesirable and confusing to users.

SUMMARY OF THE INVENTION

The present invention overcomes the drawbacks of the prior art by providing a method and apparatus for implementing a presence-based universal camp-on feature in packet-based telephony systems. In one embodiment, the present invention may take the form of a method. In accordance with the method, a first packet-based device is subscribed to a line status of a second packet-based device. A first notification is received into the first packet-based device from the second packet-based device when the line status of the second packet-based device is in a busy state. A second notification is received into the first packet-based device from the second packet-based device when the line status of the second packet-based device is in an idle state. A user of the first packet-based device is prompted with an option to establish a communication session with the second packet-based device upon receiving the second notification into the first packet-based device. A communication session is established between the first packet-based device and the second packet-based device in response to receiving an accept-call command into the first packet-based device. The first packet-based device and the second packet-based device may be packet-based telephones, such as Session Initiation Protocol (SIP) telephones.

The universal camp-on feature of the present invention is independent of the state of the called packet-based telephone. Once the camp-on feature has been invoked, and thus the calling packet-based telephone is "camped-on" the called packet-based telephone, the user of the calling phone will be prompted when the called phone transitions from busy to idle. Once the calling phone is subscribed to the line status of the called phone, the calling phone receives an initial NOTIFY message conveying the current line status of the called phone, and a subsequent NOTIFY message each time the line status of the called phone changes. The calling phone may thereby recognize receipt of a busy notification followed by receipt of an idle notification, known as the busy-to-idle transition, and prompt the user of the calling phone accordingly.

If the called phone is already in a busy state when the initial call is placed from the calling phone, the busy-to-idle transition may happen as soon as the called phone transitions out of that busy state, perhaps by terminating a call with some third party. But the called phone need not be in a busy state when the initial call is placed from the calling phone. In that case, the user of the calling phone is prompted once the called phone has first entered the busy state, and then transitioned to the idle state. Prompting the user of the calling phone upon this transition greatly increases the likelihood that the user of the called phone is present and available to receive a call. Placing the call upon receipt of a command from the user of the calling phone ensures that the user of the calling phone is present as well. Thus the probability of a successful and productive communication session being established is greatly increased.

These as well as other features and advantages of the present invention will become apparent to those of ordinary skill in the art by reading the following detailed description, with appropriate reference to the accompanying drawings. Further, it is understood that this summary is merely an example and is not intended to limit the scope of the invention as claimed.

BRIEF DESCRIPTION OF THE DRAWINGS

Various exemplary embodiments of the present invention are described herein with reference to the following drawings, wherein like numerals denote like entities.

DETAILED DESCRIPTION OF EXEMPLARY EMBODIMENTS

1. Exemplary Architecture a. Exemplary Network

Figure 1:
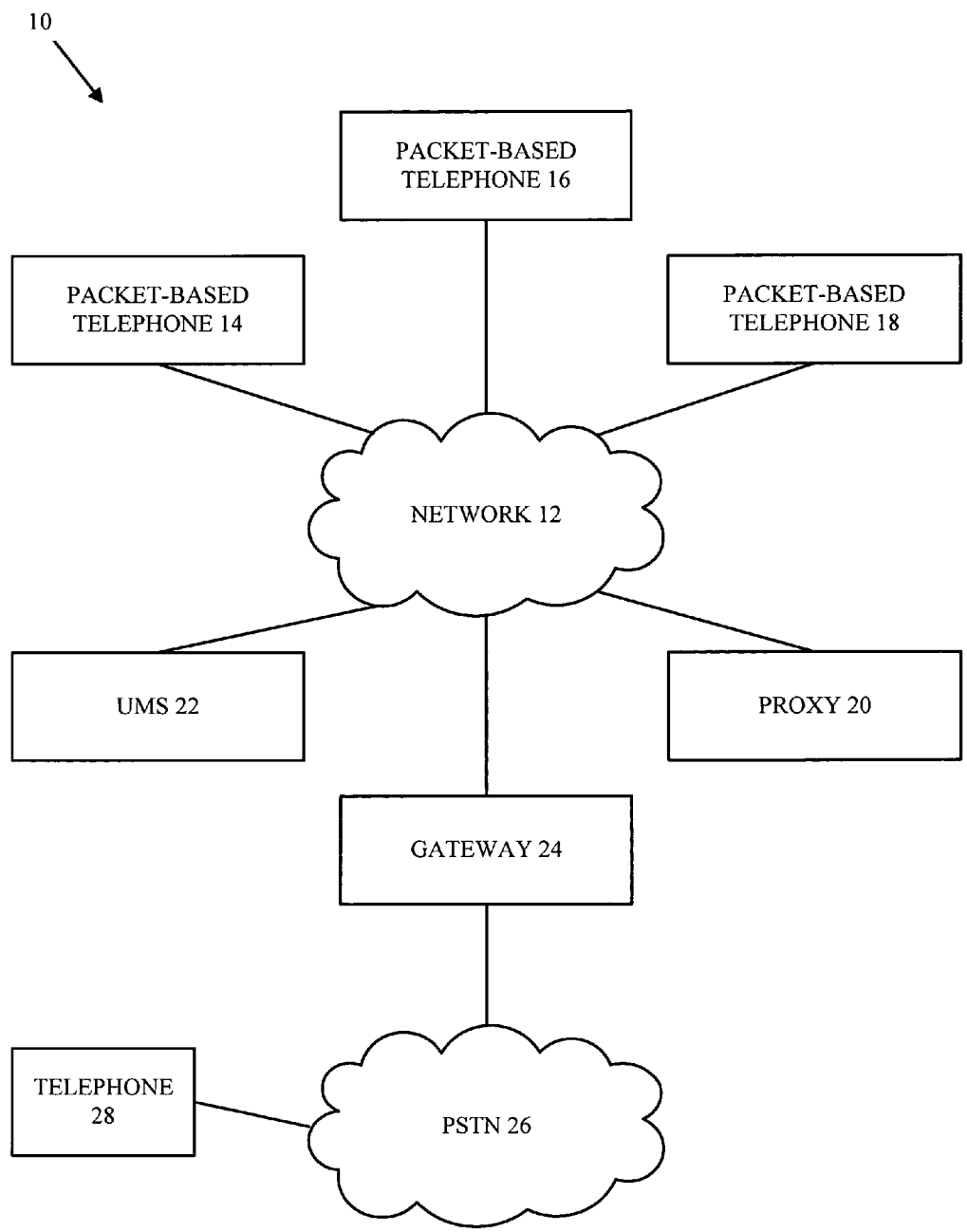
FIG. 1 is a simplified block diagram of a communications system, in which exemplary embodiments of the present invention may be employed.

FIG. 1 is a simplified block diagram of a communications system, in which exemplary embodiments of the present invention may be employed. It should be understood, however, that this and other arrangements described herein are set forth for purposes of example only. Those skilled in the art will appreciate that other arrangements and other elements (e.g., machines, interfaces, functions, orders, and groupings of functions, etc.) can be used instead, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software logic. For instance, various functions may be carried out by a processor executing instructions stored in memory.

As shown in FIG. 1, the communications system 10 comprises a network 12, packet-based telephones 14, 16, and 18, a proxy 20, a unified messaging system (UMS) 22, a gateway 24, a PSTN 26, and a telephone 28. Network 12 may be a packet-switched network. Entities may communicate within network 12 via the Internet Protocol (IP). Network 12 may include one or more wide-area networks (WANs), one or more local area networks (LANs), one or more private networks, and one or more public networks (e.g., the Internet).

Packet-based telephones 14, 16, and 18 may be VoIP-enabled and SIP-enabled telephones, such as the 3Com NBX 2102. Packet-based telephones provide functionality similar to conventional telephones, although data transmission to and from these telephones occurs over a data network, such as an IP network, rather than over a conventional telephone network. Users may be able to log in to these telephones, thereby identifying and authenticating themselves to network 12, by keying in a user identifier (perhaps a four-digit extension) and a password. Packet-based telephones 14, 16, and 18 are described more fully in connection with FIG. 2.

Although FIG. 1 shows three packet-based telephones in communication with network 12, any number of packet-based telephones may be employed without departing from the scope of the present invention. In a typical implementation, there would likely be a large number of packet-based telephones on the network, such as one for every employee in an office setting, as well as additional packet-based telephones available in locations such as laboratories.

And although the exemplary embodiments of the present invention described herein involve packet-based telephones 14, 16, and 18, proxy 20, UMS 22, and gateway 24 in communication with network 12, any telephone devices capable of communicating over a network may be employed without departing from the scope of the present invention. As a few examples, the packet-based devices may include computers, personal digital assistants, fax machines, and any other devices capable of packet-based communication. As another example, packet-based telephones 14, 16, and 18 may be cellular wireless telephones, equipped to communicate with network 12 over an air interface.

Devices communicatively coupled to network 12 may be identified by a network address, such as an IP address. The IP address may be dynamically assigned using a Simple IP process. In a Simple IP process, an entity on network 12 dynamically assigns IP addresses to properly authenticated entities upon request. Alternatively, devices such as packet-based telephone 14 may use an IP address permanently assigned to them. Once packet-based telephone 14 has obtained an IP address, it may engage in packet-data communication with other devices on network 12, such as packet-based telephones 16 and 18, proxy 20, UMS 22, and gateway 24.

Proxy 20 may be a server, facilitating operation of the IP telephony system implemented over network 12. Proxy 20 may store registration status and contact information for entities on network 12. For example, when a user logs in to SIP telephone 14, SIP telephone 14 may send a SIP REGISTER message to proxy 20. This REGISTER message may convey registration status and contact information for SIP telephone 14. Proxy 20 may store this information in a data table to facilitate, for example, communication sessions, SIP messaging, and subscriptions.

Proxy 20 may also provide transparent "pass through" operation, whereby proxy 20 may forward SIP requests and responses from one SIP entity to another via network 12. A given user may be logged in to any one or more of the SIP telephones on network 12. A calling party need only know that user's extension. When the calling party dials this extension, a SIP INVITE message is transmitted from the calling party's SIP telephone to the proxy, where it is forwarded to whichever SIP telephone(s) the called party is currently logged into.

UMS 22 may be a voicemail system, maintaining a voicemail account for each user of network 12. In operation, the user of packet-based telephone 14 may pace a call to the user of packet-based telephone 16. The user of packet-based telephone 16 may not answer the call for any number of reasons. The user of packet-based telephone 16 may be on another call at the time, logged out of packet-based telephone 16, temporarily away from packet-based telephone 16, or may simply choose not to answer. The user of packet-based telephone 14 may then be automatically connected to UMS 22 using a packet-based REFER request, or perhaps by proxy 20 sending a SIP INVITE request to UMS 22 on behalf of packet-based telephone 14. The user of packet-based telephone 14 may then leave a voicemail message in the account associated with the user of packet-based telephone 16, in the manner that is well known in the art.

Gateway 24 may act as a server, granting entities on network 12 access to PSTN 26, and vice versa. For example, gateway 24 may mediate a call between packet-based telephone 14 and telephone 28 by (i) collecting packets transmitted from packet-based telephone 14 and converting these packets into signaling understandable to PSTN 26, which would then route the signals to telephone 28, and (ii) receiving signaling from telephone 28 over PSTN 26, converting this signaling into packets, and transmitting the packets to packet-based telephone 14.

b. Exemplary Packet-based Telephone

Figure 2:
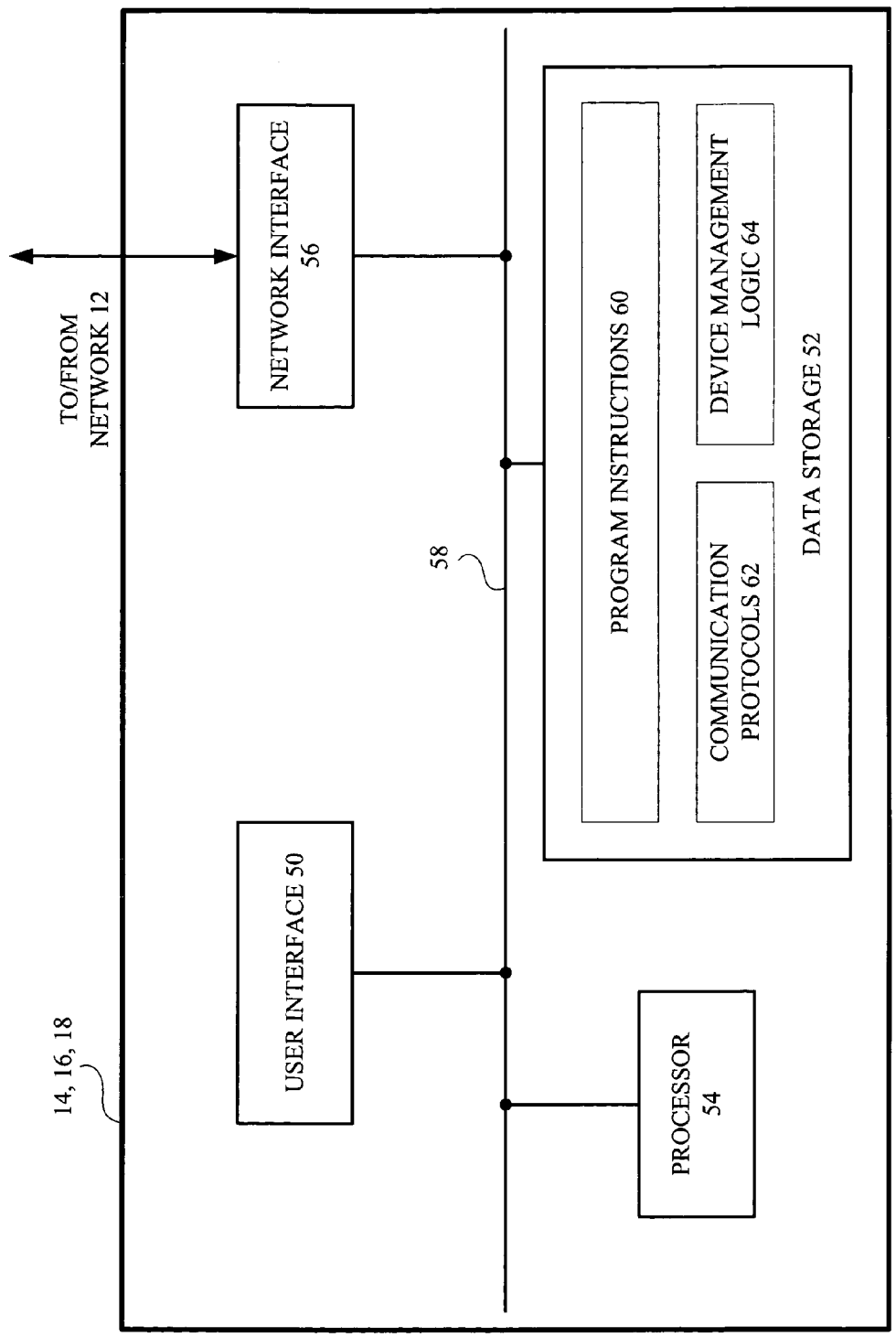
FIG. 2 is a simplified block diagram of a packet-based telephone, arranged to carry out exemplary embodiments of the present invention.

FIG. 2 is a simplified block diagram of a packet-based telephone, arranged to carry out exemplary embodiments of the present invention. In particular, FIG. 2 is a simplified block diagram of packet-based telephones 14, 16, and 18 of FIG. 1. For clarity of presentation, this description of FIG. 2 will refer only to packet-based telephone 14. Packet-based telephone 14 includes a user interface 50, a data storage 52, a processor 54, and a network interface 56, all of which may be communicatively linked by a system bus 58. By way of example, packet-based telephone 14 may be the 3Com NBX 2102.

User interface 50 may include mechanisms to provide outputs to and receive inputs from users. User interface 50 may include a handset, with which users may conduct phone calls in the manner well known in the art and in society in general. For providing outputs, user interface 50 may include a display (e.g., an LCD) for presenting text-based and/or graphics-based menus or prompts. User interface 50 may also include a speaker for playing audio recordings and prompts to users, as well as for providing a speakerphone feature. User interface 50 may also include various LEDs to indicate various states, such as whether or not a user has a new voicemail.

For receiving inputs and commands from users, user interface 50 preferably includes one or more input mechanisms, such as buttons, a touch-sensitive display, and/or a microphone, etc. The buttons may include a conventional number pad to enter phone numbers, and any assortment of additional buttons, such as a "Speaker" button to engage the speakerphone feature, a "Redial" button, a "Conference" button for establishing a conference call, a "Camp-On" button for invoking the camp-on feature of the present invention, and/or a "Feature" button, with which a user may take advantage of any number of programmable features by perhaps pressing the "Feature" button followed by a numeric code corresponding to a particular feature. Any number of other buttons, such as a "Mute" button, any number of "Speed Dial" buttons, and any other buttons and input mechanisms may also be included as part of user interface 50.

Data storage 52 may store, among other date, program instructions 60, communication protocols 62, and device management logic 64. Data storage 52 may take various forms, in one or more parts, such as a non-volatile storage block and/or a removable storage medium. Communication protocols 62 may enable receiving data from and sending data to entities on network 12 and beyond, and may include, for example, SIP, DHCP, HTTP, TCP, IP, DNS, SMTP, IMCP, and PPP, among others. Device management logic 64 may manage other aspects of packet-based telephone 14, such as memory and file management.

Program instructions 60 may comprise machine language instructions executable by processor 54 to carry out various functions described herein. Processor 54 may thereby control many of the operations of packet-based telephone 14 by executing program instructions 60, and may comprise one or more processors (e.g., parallel processors), such as a general purpose microprocessor and/or a discrete digital signal processor. Network interface block 56 provides packet-based telephone 14 with connectivity to network 12, and may take the form of an Ethernet card or other suitable mechanism.

2. Exemplary Operation a. Exemplary Methods

Figure 3:
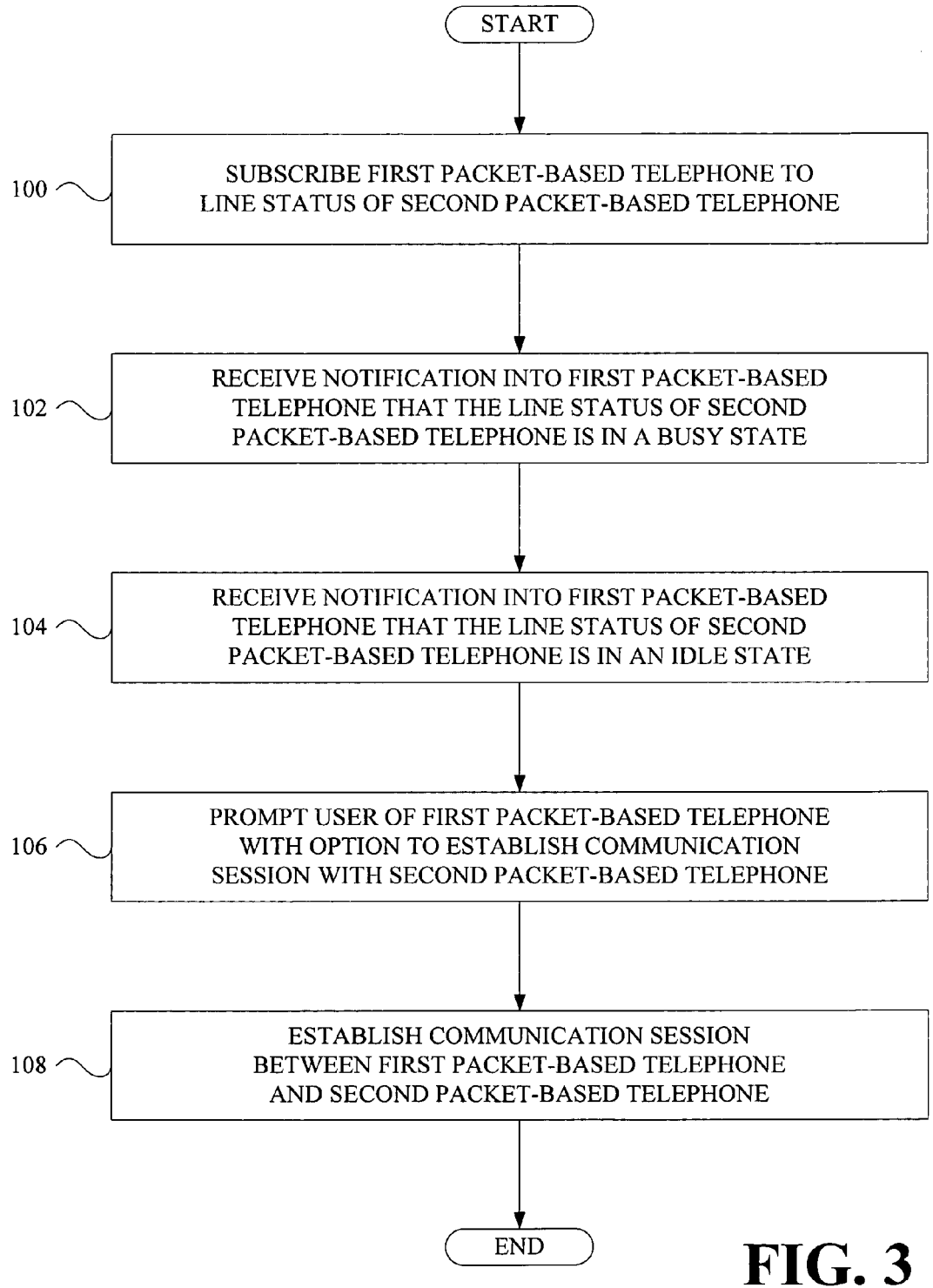
FIG. 3 is a flowchart of an exemplary embodiment of the present invention, carried out along the communications system of FIG. 1.

FIG. 3 is a flowchart of an exemplary embodiment of the present invention, carried out along the communications system of FIG. 1. At 100, packet-based telephone 14 subscribes to the line status of packet-based telephone 16. This may occur in response to the user of packet-based telephone 14 invoking the camp-on feature of the present invention, perhaps after placing an initial call to packet-based telephone 16. Without departing from the scope of the present invention, packet-based telephone 16 may be in any state (e.g., busy, idle, ringing, logged out, connected, etc.) at the time the user of packet-based telephone 14 invokes the camp-on feature.

The user of packet-based telephone 14 may invoke the camp-on feature in a variety of ways. As one example, the user could press the "Camp-On" button and then hang up the handset or press the "Speaker" button to end the call. Or the user could press the "Feature" button, key in a code such as "208" for the camp-on feature, and then end the call. In general, any manner of invoking the camp-on feature, such as using a touch screen or speaking a voice command may be used without departing from the scope of the present invention.

As one example, the user of packet-based telephone 14 may have invoked the camp-on feature because the user of packet-based telephone 16 was on another call (with a third party) at the time the user of packet-based telephone 14 placed the initial call. This may have resulted in packet-based telephone 14 receiving a "busy" notification or "busy" signal from packet-based telephone 16. Alternatively, packet-based telephone 16 may have placed the call with the third party "on hold" and then accepted the call from packet-based telephone 14. In that case, the user of packet-based telephone 14 may have invoked the camp-on feature because the user of packet-based telephone 16 preferred to continue the call with the third party.

Other possibilities exist as well for the state of packet-based telephone 16 when packet-based telephone 14 places the initial call to packet-based telephone 16. The user of packet-based telephone 16 may have not been logged in to any packet-based telephone on network 12 at the time. The user of packet-based telephone 16 may have been logged in but simply away from her desk, causing the user of packet-based telephone 14 to hear enough rings to decide that using the camp-on feature of the present invention was warranted. The user of packet-based telephone 14 may have already been transferred to a voicemail account maintained by UMS 22 for the user of packet-based telephone 16. Other states are possible as well, the general point being that the present invention is independent of the state of packet-based telephone 16 because packet-based telephone 14 will simply monitor the line status of packet-based telephone 16 until that line status is first busy, and then idle.

Once the user of packet-based telephone 14 has invoked the camp-on feature (i.e. input a camp-on command), packet-based telephone 14 may transmit to proxy 20 a SUBSCRIBE message, subscribing packet-based telephone 14 to the registration status and contact information of packet-based telephone 16. Proxy 20 may respond by transmitting a NOTIFY message to packet-based telephone 14, containing the registration status and contact information of packet-based telephone 16. Packet-based telephone 14's subscription via proxy 20 to the registration status and contact information of packet-based telephone 16 will be ongoing, which means that proxy 20 will notify packet-based telephone 14 of any change to the user of packet-based telephone 16's registration status and contact information.

Changes in the user of packet-based telephone 16's registration status and contact information of which packet-based telephone 14 may be notified include the user of packet-based telephone 16 logging out of packet-based telephone 16, or perhaps logging in to one or more additional packet-based telephones on network 12. If the user of packet-based telephone 16 logs out of packet-based telephone 16, and is not logged in to at least one packet-based telephone on network 12, packet-based telephone 14 may continue to camp-on packet-based telephone 16 until such time as the user of packet-based telephone 16 logs back in and causes packet-based telephone 16 to go busy and then idle.

If the user of packet-based telephone 16 logs in to one or more packet-based telephones on network 12 in addition to packet-based telephone 16, packet-based telephone 14 may be notified of each such additional packet-based telephone, and may monitor whether any one of those packet-based telephones makes the busy-to-idle transition. Packet-based telephone 14 may transmit a SUBSCRIBE message to packet-based telephone 16 and each additional packet-based telephone to which the user of packet-based telephone 16 logs in, subscribing to the line status of packet-based telephone 16 and each additional packet-based telephone.

At 102, packet-based telephone 14 receives a notification from packet-based telephone 16 that the line status of packet-based telephone 16 is in a busy state. If the user of packet-based telephone 16 was on another call at the time packet-based telephone 14 placed the initial call, this notification will be received while packet-based telephone 16 is still on that call. If, however, the user of packet-based telephone 16 was not on another call when packet-based telephone 14 placed the initial call, this notification will not occur until the user of packet-based telephone 16 initiates a call to some third party. If the user of packet-based telephone 16 is logged in to one or more packet-based telephones on network 12 in addition to packet-based telephone 16, the notification may come from one of those additional packet-based telephones.

At 104, packet-based telephone 14 receives a notification from packet-based telephone 16 that the line status of packet-based telephone 16 is in an idle state. If the user of packet-based telephone 16 was on another call at the time packet-based telephone 14 placed the initial call, this notification will be received when packet-based telephone 16 terminates that call. If, however, the user of packet-based telephone 16 was not on another call when packet-based telephone 14 placed the initial call, this notification will not occur until the user of packet-based telephone 16 initiates a call to some third party, and then terminates that call. If the user of packet-based telephone 16 is logged in to one or more packet-based telephones on network 12 in addition to packet-based telephone 16, the notification may come from one of those additional packet-based telephones. The idle notification preferably is received by packet-based telephone 14 from the same packet-based telephone from which the busy notification was received at step 102, indicating that the user of packet-based telephone 16 is present at the particular phone.

The triggering sequence that packet-based telephone 14 recognizes is when packet-based telephone 16 (or an additional packet-based telephone to which the user of packet-based telephone 16 is logged in) transitions from a busy state to an idle state. As explained, it may be the case that packet-based telephone 16 (or the additional phone) has to first enter the busy state, and then transition out of the busy state into the idle state. Note that if the user of packet-based telephone 16's first call happens to be to packet-based telephone 14, packet-based telephone 14 may cancel the subscription to the line status of packet-based telephone 16, as the camp-on would then be unnecessary. When packet-based telephone 14 receives the busy notification followed by the idle notification, packet-based telephone 14 has implicitly been notified that the user of packet-based telephone 16 is present and available to receive a call.

At 106, packet-based telephone 14 prompts the user of packet-based telephone 14 with the option to establish a communication session with packet-based telephone 16 (or the additional phone). Via user interface 50, packet-based telephone 14 may visibly and/or audibly notify the user that packet-based telephone 16 (or the additional phone) has just undergone the busy-to-idle transition. This notification may take the form of a message on an LCD or other screen, or perhaps lighting or flashing a message or graphic. Alternatively or additionally, packet-based telephone 14 may sound an alarm or spoken message.

At 108, a communication session is established between packet-based telephone 14 and packet-based telephone 16 (or the additional phone) in response to the user of packet-based telephone 14 entering an accept-call command, perhaps by picking up the handset, entering a feature code, pressing "Speaker", pressing another button, speaking a voice command, etc.

Packet-based telephone 14 will then transmit an INVITE message to packet-based telephone 16 (or the additional phone), which the user of packet-based telephone 16 may accept by picking up the handset or pressing "Speaker", as examples. Packet-based telephone 16 (or the additional phone) would then transmit a "200 OK" response to packet-based telephone 14, indicating acceptance. Once packet-based telephone 14 sends packet-based telephone 16 (or the additional phone) an ACK message, the communication session may be established. Through the combination of (i) prompting the user of packet-based telephone 14 upon the busy-to-idle transition undergone by packet-based telephone 16 (or the additional phone) and (ii) sending the INVITE message upon receipt of the accept-call command from the user of packet-based telephone 14, the present invention ensures that both the calling party and the called party are present to engage in a communication session.

Figure 4:
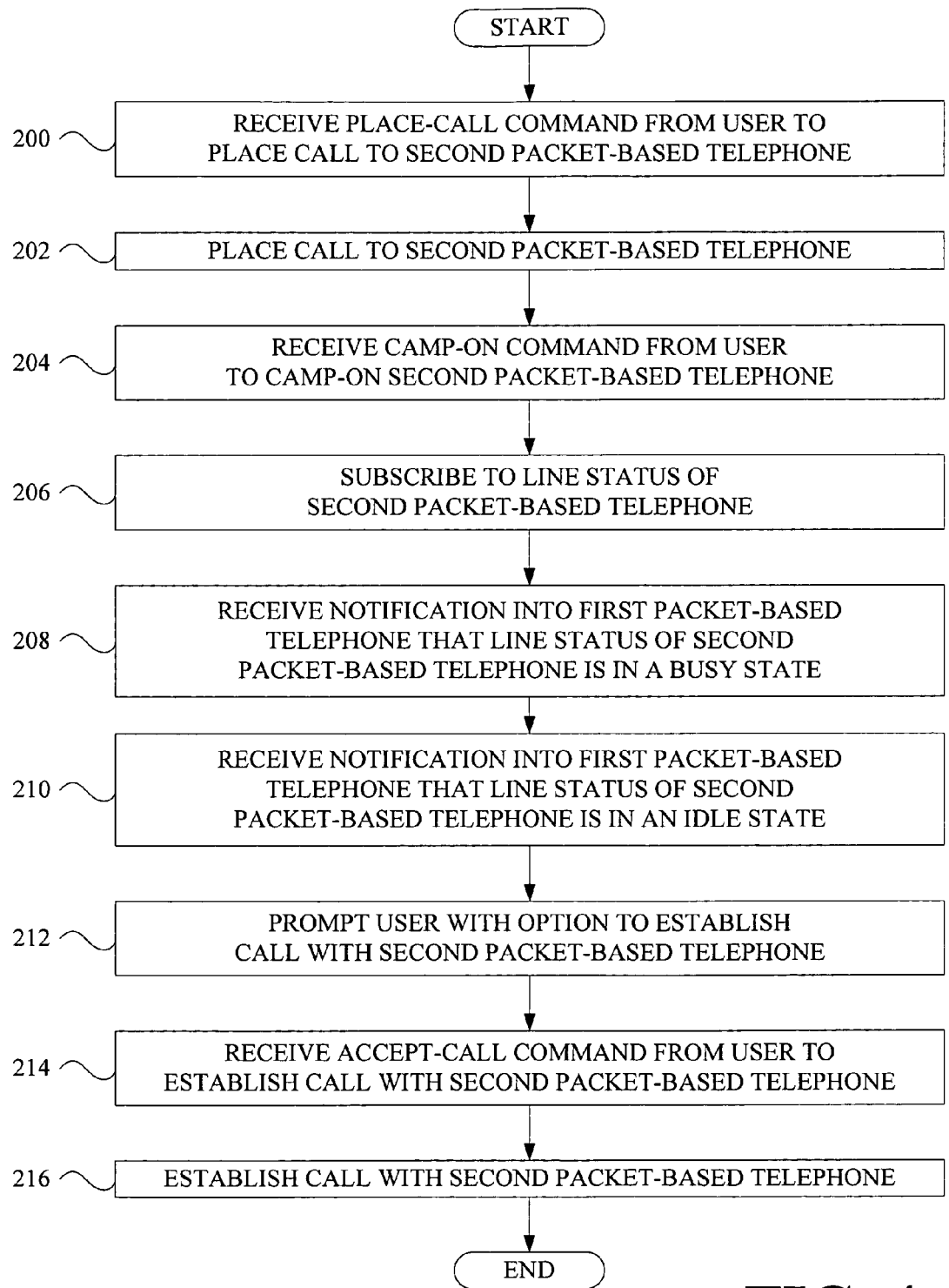
FIG. 4 is a flowchart of an exemplary embodiment of the present invention, carried out along the communications system of FIG. 1.

FIG. 4 is a flowchart of an exemplary embodiment of the present invention, carried out along the communications system of FIG. 1. At 200, packet-based telephone 14 receives a command from a user to place a call to packet-based telephone 16. At 202, packet-based telephone 14 places a call to packet-based telephone 16, perhaps using an INVITE message. At 204, packet-based telephone 14 receives a command from the user of packet-based telephone 14 to camp-on packet-based telephone 16. At 206, packet-based telephone 14 subscribes to the line status of packet-based telephone 16, using a SUBSCRIBE request.

At 208, packet-based telephone 14 receives notification that the line status of packet-based telephone 16 is in a busy state, in the form of a NOTIFY message. At 210, packet-based telephone 14 receives notification that the line status of packet-based telephone 16 is in an idle state, also in the form of a NOTIFY message. At 212, packet-based telephone 14 prompts the user of packet-based telephone 14 to establish a call with packet-based telephone 16. Upon receiving a command to accept the call at 214, packet-based telephone 14 establishes a call with packet-based telephone 16 at 216, using an INVITE "200 OK", and ACK sequence.

b. Exemplary Call Flow—Called Phone in Busy State

Figure 5:
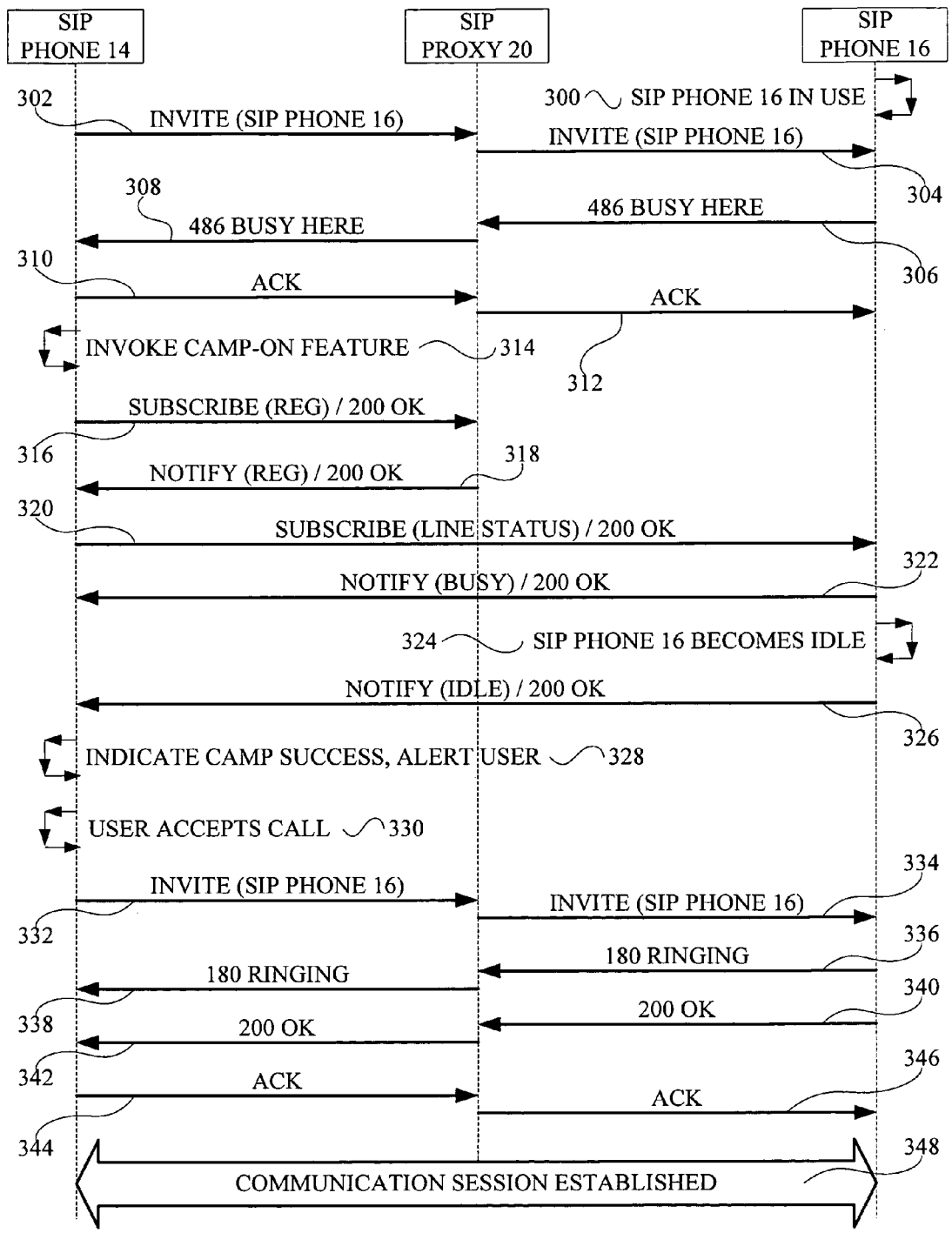
FIG. 5 is a call flow diagram illustrating an exemplary embodiment of the present invention, carried out along the communications system of FIG. 1.

FIG. 5 is a call flow diagram illustrating an exemplary embodiment of the present invention, carried out along the communications system of FIG. 1. In particular, FIG. 5 illustrates a situation where the called party's phone is busy at the time the calling party places an initial call. By way of example and without limiting the scope of the present invention, packet-based telephones may be referred to herein as SIP phones. Similarly, proxy 20 may be referred to as SIP proxy 20. Referring now to FIG. 5 at 300, SIP phone 16 is in use (busy), perhaps on a call with some other SIP phone or with telephone 28 via gateway 24.

At 302, SIP phone 14 transmits an INVITE request to SIP proxy 20, indicating SIP phone 16 as the intended recipient, which may occur in response to a user of SIP phone 14 entering a command to place a call to SIP phone 16. At 304, SIP proxy 20 forwards the INVITE to SIP phone 16. At 306, SIP phone 16 responds with a "486 Busy Here" message, conveying the state information that SIP phone 16 is still in use. At 308, SIP proxy 20 forwards the "486 Busy Here" message to SIP phone 14. At 310 and 312, SIP phone 14 acknowledges the "486 Busy Here" response with a SIP ACK message, via SIP proxy 20.

Having received the busy notification, at 314, the user of SIP phone 14 invokes the camp-on feature in the manner described above. At 316, SIP phone 14 transmits a SUBSCRIBE message to SIP proxy 20, subscribing to the registration status and contact information of SIP phone 16. Also subsumed within step 316 is the fact that SIP proxy 20 responds to SIP phone 14's SUBSCRIBE request with a "200 OK" response. For clarity of presentation, this exchange is expressed as "SUBSCRIBE (Reg Status)/200 OK" of FIG. 5. Similar concatenations of SIP responses and requests are made throughout the call flow diagrams of FIGS. 5–10. At 318, SIP proxy 20 transmits a SIP NOTIFY message to SIP phone 14, conveying the registration status and contact information of SIP phone 16, to which SIP phone 14 responds "200 OK".

At 320, SIP phone 14 transmits a SUBSCRIBE request to SIP phone 16, requesting a subscription to SIP phone 16's line status. SIP phone 16 conveys that the subscription is granted with a "200 OK" response. At 322, SIP phone 16 provides SIP phone 14 with a notification of SIP phone 16's busy state, in the form of a NOTIFY (Busy) message, which SIP phone 14 acknowledges with a "200 OK" response. At 324, SIP phone 16 becomes idle, which may occur when the user terminates whatever call was ongoing.

At 326, SIP phone 16 notifies SIP phone 14 of the change in line status by sending a NOTIFY (Idle) message, to which SIP phone 14 responses "200 OK". At 328, SIP phone 14 notifies its user of the camp success, in the visible and/or audible manner described above. This notification of camp success is accompanied by a prompt to the user of SIP phone 14 of an option to establish a call with SIP phone 16. At 330, the user of SIP phone 14 accepts the call, perhaps by picking up the handset or by pressing "Speaker", etc.

At 332 and 334, SIP phone 14 transmits an INVITE request to SIP phone 16, via SIP proxy 20. At 336 and 338, SIP phone 16 transmits a "180 Ringing" response to SIP phone 14, via SIP proxy 20, indicating that SIP phone 16 is ringing. At 340 and 342, SIP phone 16 transmits a "200 OK" response to SIP phone 14, via SIP proxy 20, indicating that the user of SIP phone 16 has accepted the call, perhaps by picking up the handset or pressing "Speaker". At 344 and 346, SIP phone 14 transmits an ACK message to SIP phone 16, via SIP proxy 20. At 348, as a result of this signaling, a communication session is established between SIP phones 14 and 16.

The call flow of FIG. 5 is also representative of an alternative embodiment of the present invention, specifically one where the user of SIP phone 14 places a call to a conventional telephone, such as telephone 28, via PSTN 26. In that case, SIP phone 14 would transmit an INVITE message to gateway 24. Gateway 24 maintains some number of circuits that it makes available to packet-based telephones on network 12 to place calls to conventional telephones connected to PSTN 26. There may be times, however, when none of these circuits are available, such as when all of them are in use. If this is the case when SIP phone 14 places a call to telephone 28, the user of SIP phone 14 may invoke the camp-on feature of the present invention, in which case the call flow and processing would be substantially similar to that of FIG. 5.

Unlike the case illustrated by FIG. 5, however, SIP phone 14 in this gateway example is not camping-on a particular phone; rather, SIP phone 14 is camping-on gateway 24, awaiting a circuit with which to connect to PSTN 28. This circuit may be referred to as an "outside line". This results in several differences between this gateway example and the example illustrated by FIG. 5. First, the message that the gateway transmits to SIP phone 14 to indicate that no outside lines are currently available may be a "503 Service Unavailable" message, rather than the "486 Busy Here" message shown at 306 and 308 of FIG. 5. The particular implementation is left to the programmer, however, and a gateway could be programmed to transmit a "486 Busy Here" message in this situation, within the skill of those in the art.

A second difference may be that, rather than having a called SIP phone go idle, as shown at step 324 of FIG. 5, the event may be that one of the outside-line circuits becomes available for use by SIP phone 14. Gateway 24 may then reserve that circuit for SIP phone 14 (probably for only a limited time), and transmit a NOTIFY message to SIP phone 14 via SIP proxy 20, notifying SIP phone 14 of this change in the line status of the gateway, similar to step 326 in FIG. 5. Gateway 24 could be programmed to provide busy and idle notifications similar to those provided by SIP phone 16, such that SIP phone 14 would not need to be programmed any differently to handle this gateway example, even though gateway 24 is not busy and idle in the same sense as SIP phone 16.

From there, the call flow and processing would be substantially the same as that shown in steps 328-348 of FIG. 5. Essentially, SIP phone 14 prompts the user of SIP phone 14, the user accepts the call, and a communication session is thereby established between SIP phone 14 and gateway 24. Gateway 24 may then mediate a telephone call or other communication session with a device in communication with PSTN 26, such as telephone 28.

c. Exemplary Call Flow—Called Phone in Idle/Ringing State

Figure 6:
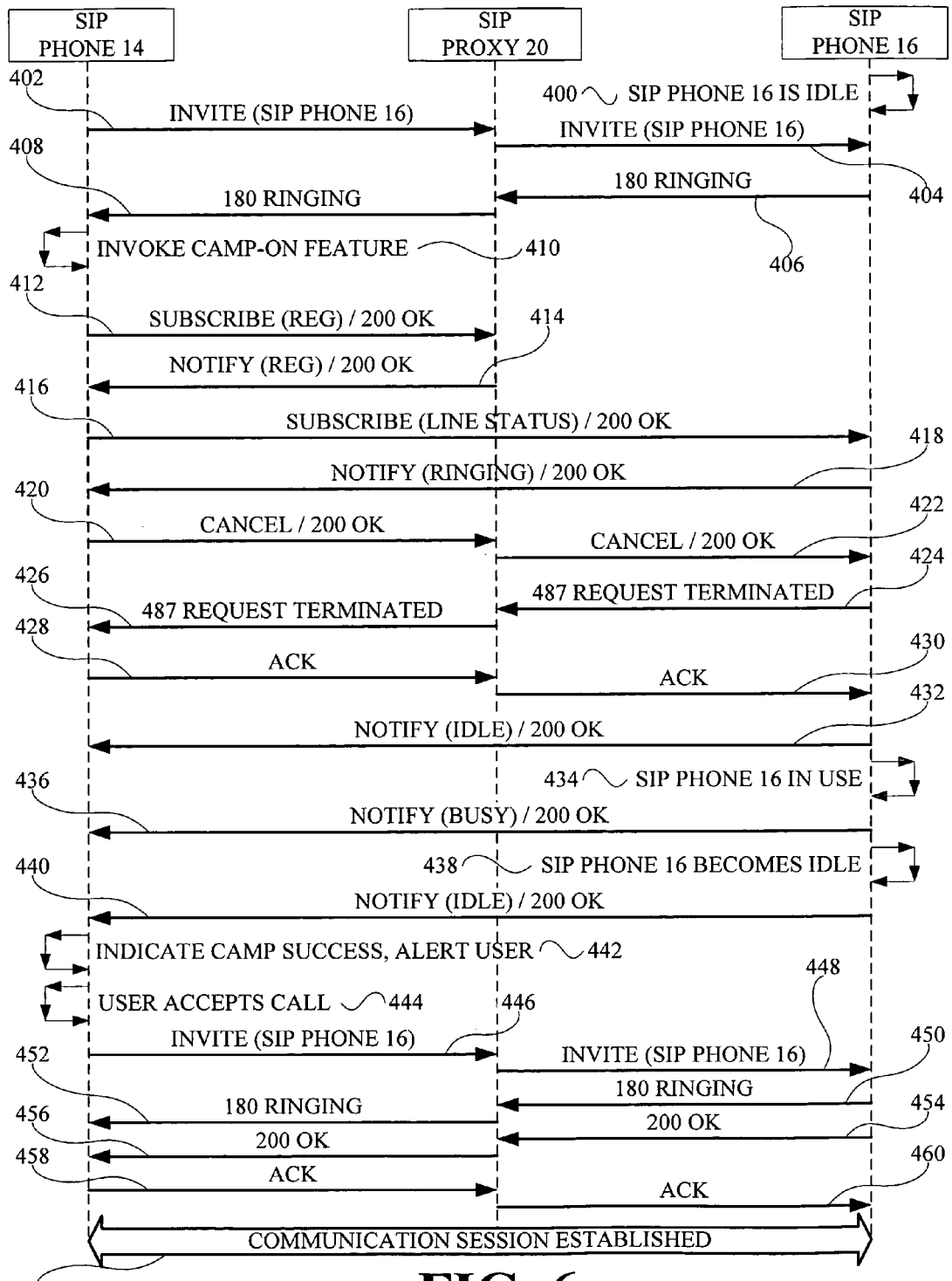
FIG. 6 is a call flow diagram illustrating an exemplary embodiment of the present invention, carried out along the communications system of FIG. 1.

FIG. 6 is a call flow diagram illustrating an exemplary embodiment of the present invention, carried out along the communications system of FIG. 1. In particular, FIG. 6 illustrates a situation where the called party's phone is idle when the calling party places the initial call, and is therefore ringing when the calling party invokes the camp-on feature of the present invention. FIG. 6 may represent a situation where the user of SIP phone 16 is logged in but is away from her desk, or simply chooses to not answer the call.

At 400, SIP phone 16 is in the idle state, indicating that the user of SIP phone 16 is logged in, but may or may not be present near the phone. The idle state does indicate that SIP phone 16 is not engaged in an ongoing communication session. At 402 and 404, SIP phone 14 transmits an INVITE request to SIP phone 16, via SIP proxy 20. At 406 and 408, SIP phone 16 transmits a "180 Ringing" response to SIP phone 14, via SIP proxy 20, indicating that SIP phone 16 is in a ringing state. At 410, the user of SIP phone 14 invokes the camp-on feature.

At 412 and 414, via SIP proxy 20, SIP phone 14 subscribes to and is notified of the registration status and contact information of SIP phone 16. At 416, SIP phone 14 subscribes to the line status of SIP phone 16. At 418, SIP phone 16 transmits a NOTIFY message to SIP phone 14, indicating that SIP phone 16 is still ringing. At 420 and 422, via SIP proxy 20, SIP phone 14 transmits a CANCEL message to SIP phone 16, canceling the INVITE sent at 402 and 404. SIP phone 16 no longer has the option of responding "200 OK" to the INVITE, but does respond "200 OK" to SIP phone 14's CANCEL. At 424 and 426, via SIP proxy 20, SIP phone 16 responds to SIP phone 14's INVITE message with "487 Request Terminated". At 428 and 430, via SIP proxy 20, SIP phone 14 transmits an ACK to SIP phone 16.

At 432, SIP phone 16 has stopped ringing and is now idle, and thus transmits a NOTIFY to SIP phone 14, conveying this line status. SIP phone 14 responds with "200 OK". At 434, SIP phone 16 is in use, indicating that perhaps the user of SIP phone 16 has called some third party. At 436, SIP phone 16 notifies SIP phone 14 of this updated line status, to which SIP phone 14 responds "200 OK". At 438, SIP phone 16 becomes idle. At 440, SIP phone 16 once again notifies SIP phone 14 of this updated line status, to which SIP phone 14 responds "200 OK".

Recognizing the busy-to-idle transition made by SIP phone 16, at 442, SIP phone 14 indicates camp success to the user. At 444-462, a communication session is established in substantially the same the manner as that described with respect to steps 330-348 of FIG. 5.

d. Exemplary Call Flow—Calling Party Connected to Called Party's Voicemail

Figure 7:
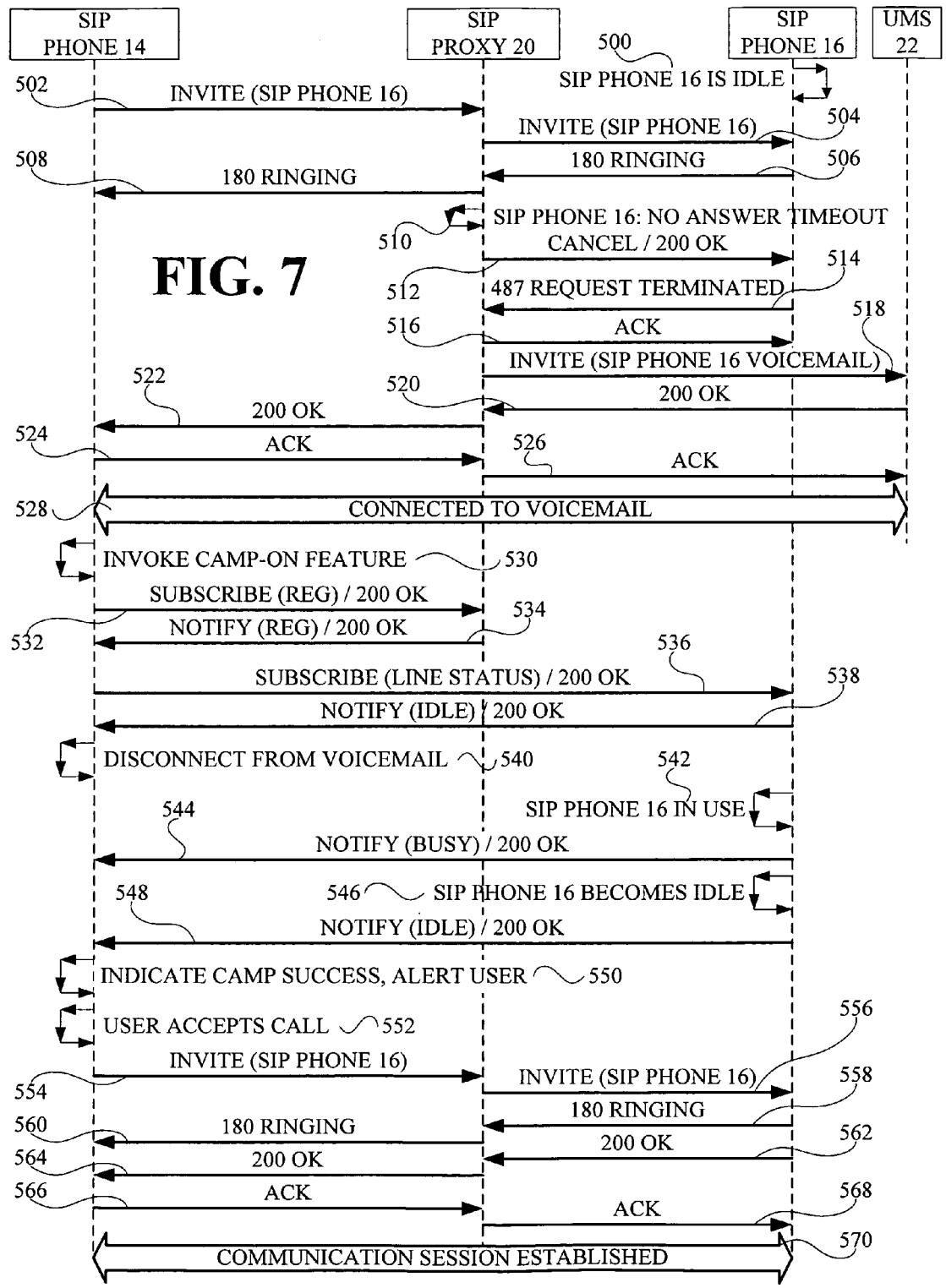
FIG. 7 is a call flow diagram illustrating an exemplary embodiment of the present invention, carried out along the communications system of FIG. 1.

FIG. 7 is a call flow diagram illustrating an exemplary embodiment of the present invention, carried out along the communications system of FIG. 1. In particular, FIG. 7 illustrates a situation where the calling party has been transferred to the called party's voicemail account at the time the calling party invokes the camp-on feature.

At 500, SIP phone 16 is idle. At 502 and 504, SIP phone 14 transmits an INVITE request to SIP phone 16. At 506 and 508, SIP phone 16 responds that it is ringing. At 510, SIP proxy 20 detects that SIP phone 16 has not yet answered the call, and that a timeout period has elapsed. At 512, SIP proxy 20 cancels the INVITE from SIP phone 14 by transmitting a CANCEL message to SIP phone 16, to which SIP phone 16 responds only as far as SIP proxy 20, "200 OK". Note that while SIP is an end-to-end protocol, some intermediate messaging may occur between a proxy and only one endpoint. Steps 512-516 are examples of this type of messaging.

At 514, SIP phone 16 transmits to SIP proxy 20 a "487 Requested Terminated" response. At 516, SIP proxy 20 acknowledges the "487 Request Terminated" response with an ACK. At 518, SIP proxy 20 transmits an INVITE request to UMS 22, indicating the voicemail account associated with SIP phone 16 as the requested destination. At 520, UMS 22 conveys acceptance of the INVITE with a "200 OK" response to SIP proxy 20. At 522, SIP proxy 20 transmits a "200 OK" to SIP phone 14. In this manner, the processing and messaging occurring from step 510 to 520 is invisible to SIP phone 14, which sees only the "200 OK" response at 522, although it may take longer to receive the "200 OK" than if SIP phone 16 had immediately accepted the call, and SIP phone 14 winds up connected to UMS 22 rather than to SIP phone 16.

At 524 and 526, SIP phone 14 acknowledges UMS 22's "200 OK" with an ACK. At 528, SIP phone 14 is engaged in a communication session with UMS 22, specifically with the voicemial account maintained for SIP phone 16 by UMS 22. Alternatively, the communication session between SIP phone 14 and UMS 22 may be initiated by SIP proxy 20 transmitting a REFER message to SIP phone 14 once SIP proxy 20 determines that the timeout period for SIP phone 16 to answer has expired. SIP phone 14 would then transmit an INVITE message to UMS 22, rather than SIP proxy 20 transmitting the INVITE message to UMS 22 as shown at step 518.

But the user of SIP phone 14 may not want to leave a voicemail; the user of SIP phone 14 may prefer instead to make use of the present invention. At 530, the user of SIP phone 14 thus invokes the camp-on feature. At 532 and 534, SIP phone 14 subscribes to and is notified of the registration status and contact information of SIP phone 16. At 536 and 538, SIP phone 14 subscribes to the line status of SIP phone 16 and is notified that SIP phone 16 is still idle. At 540, SIP phone 14 engages in signaling to disconnect the ongoing communication session between SIP phone 14 and UMS 22.

The processing and call flow from this point forward, in steps 542-570, is substantially the same as that of steps 434-462 of FIG. 6. Basically, SIP phone 16 becomes busy and then becomes idle. SIP phone 16 notifies SIP phone 14 each time SIP phone 16's line status changes, and therefore implicitly notifies SIP phone 14 when the line status of SIP phone 16 transitions from busy to idle. The user of SIP phone 14 is notified of the camp success, accepts the call, and a communication session is established between SIP phone 14 and SIP phone 16.

e. Exemplary Call Flow—Called Phone in Logged-Out State

Figure 8:
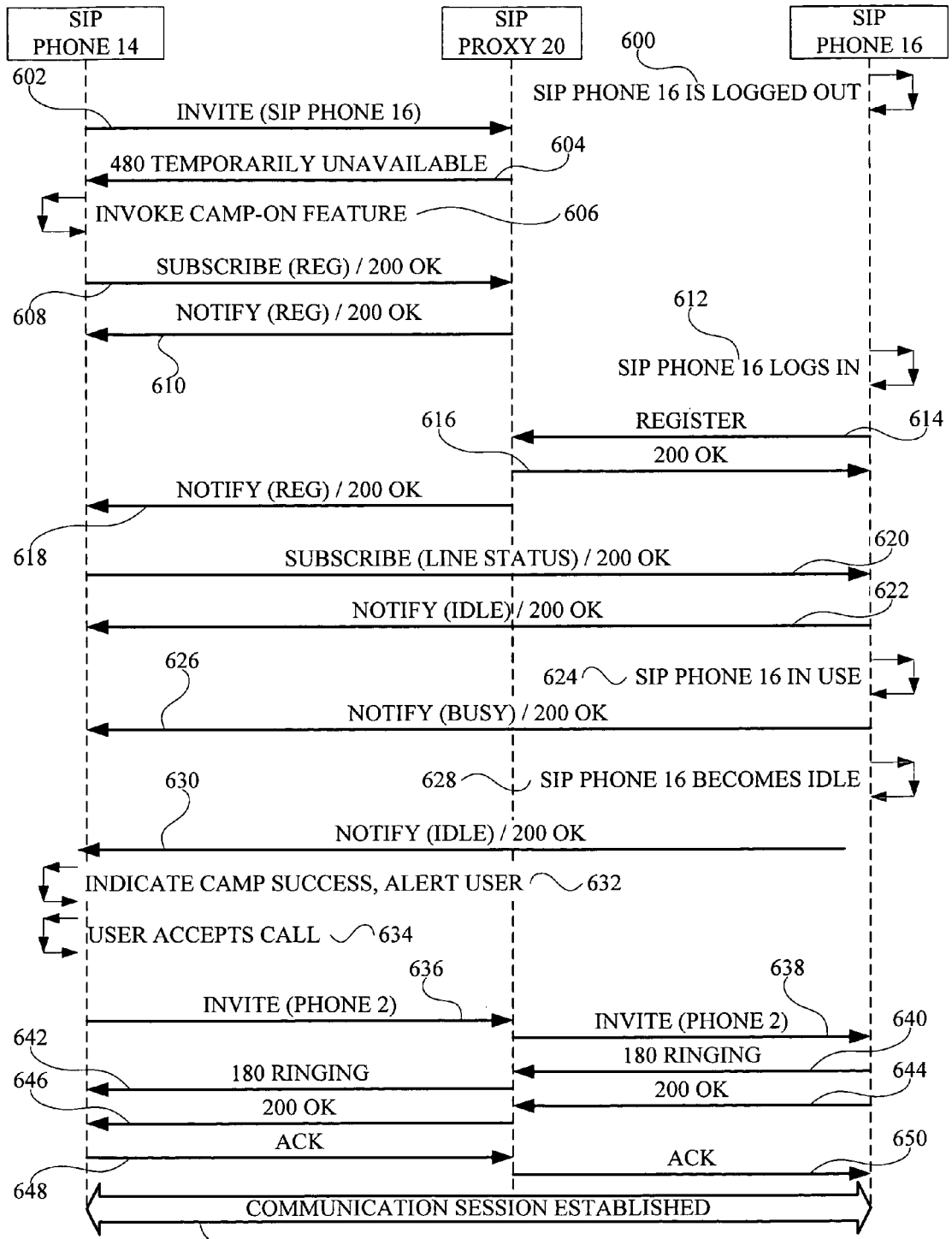
FIG. 8 is a call flow diagram illustrating an exemplary embodiment of the present invention, carried out along the communications system of FIG. 1.

FIG. 8 is a call flow diagram illustrating an exemplary embodiment of the present invention, carried out along the communications system of FIG. 1. In particular, FIG. 8 illustrates a situation where the called party is logged out of the phone system at the time the calling party invokes the camp-on feature of the present invention.

At 600, SIP phone 16 is in a logged-out state, which means that the user of SIP phone 16 has entered a logout command, which may take the form of pressing a "Logout" button, or perhaps entering a feature code and/or a password, so that only a properly authenticated user may log out. At 602, SIP phone 14 transmits an INVITE request to SIP proxy 20, indicating SIP phone 16 as the intended recipient, which may occur in response to the user of SIP phone 14 attempting to place a call to SIP phone 16. At 604, because SIP phone 16 is not logged in, SIP proxy 20 transmits a "480 Temporarily Unavailable" response to SIP phone 14.

At 606, the user of SIP phone 14 invokes the camp-on feature. At 608 and 610, SIP phone 14 subscribes to and is notified of the registration status and contact information of SIP phone 16, via SIP proxy 20. Here, the contact information is a null value due to SIP phone 16's logged-out state. At 612, the user of SIP phone 16 logs in to SIP phone 16, perhaps by keying in an extension and/or a password. At 614 and 616, SIP phone 16 registers with SIP proxy 20 by transmitting a REGISTER request to SIP proxy 20, to which SIP proxy 20 responds "200 OK".

At 618, SIP proxy 20 sends a NOTIFY message to SIP phone 14 with SIP phone 16's updated registration status and contact information, to which SIP phone 14 responds "200 OK". At 620, SIP phone 14 subscribes to the line status of SIP phone 16, to which SIP phone 16 responds "200 OK". At 622, SIP phone 16 transmits to SIP phone 14 a NOTIFY (Idle) message, to which SIP phone 14 responds "200 OK". From this point, the processing and call flow in steps 624-652 is substantially the same as that of steps 542-570 of FIG. 7. Essentially, SIP phone 16 goes busy, and then goes idle. The user of SIP phone 14 is notified and accepts the call, and a communication session between SIP phones 14 and 16 is established.

f. Exemplary Call Flow—Called Party Logged in to Multiple Endpoints

Figure 9:
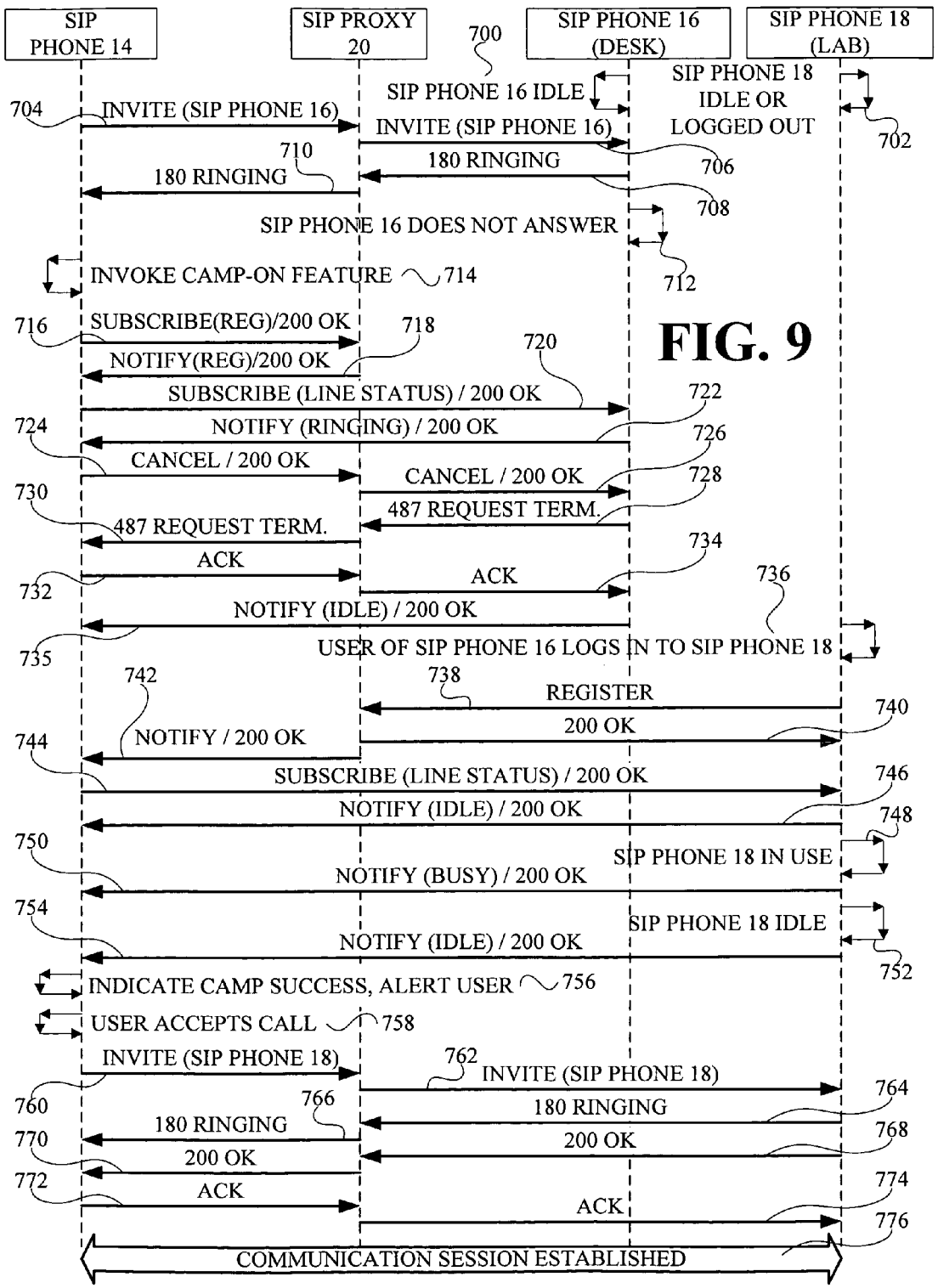
FIG. 9 is a call flow diagram illustrating an exemplary embodiment of the present invention, carried out along the communications system of FIG. 1.

FIG. 9 is a call flow diagram illustrating an exemplary embodiment of the present invention, carried out along the communications system of FIG. 1. In particular, FIG. 9 illustrates a situation where the called party logs in to a second SIP phone on the network after the calling party invokes the camp-on feature but before the camp-on feature has successfully resulted in a communication session.

At 700, SIP phone 16 is in an idle state. At 702, SIP phone 18 is in an idle or logged-out state. SIP phone 18 is an additional SIP phone in communication with network 12, and may be located, for example, in a laboratory where the user of SIP phone 16 may perform some aspect of her job. At 704 and 706, SIP phone 14 transmits an INVITE request to SIP phone 16. At 708 and 710, SIP phone 16 responds "180 Ringing" to SIP phone 14. At 712, SIP phone 16 still has not answered the call. At 714, the user of SIP phone 14 invokes the camp-on feature. At 716 and 718, SIP phone 14 subscribes to and receives notification of the registration status and contact information of SIP phone 16. At 720 and 722, SIP phone 14 subscribes to and receives notification of SIP phone 16's line status, which is still ringing.

At 724 and 726, SIP phone 14 transmits a CANCEL message to SIP phone 16, canceling the INVITE sent at 704 and 706. At 728 and 730, SIP phone 16 transmits a "487 Request Terminated" response to SIP phone 14. At 732 and 734, SIP phone 14 acknowledges the "487 Request Terminated" with an ACK. At 735, SIP phone 16 transmits a NOTIFY request to SIP phone 14, indicating that the line status of SIP phone 16 is now idle.

At 736, the user of SIP phone 16 logs into SIP phone 18. At 738 and 740, SIP phone 18 sends a REGISTER message to SIP proxy 20, to which SIP proxy 20 responds "200 OK". The user of SIP phone 16 is now logged in to multiple endpoints on network 12, such that when a call is placed to SIP phone 16, both SIP phone 16 and SIP phone 18 will ring. At 742, SIP proxy 20 transmits a NOTIFY message to SIP phone 14, notifying SIP phone 14 that the user of SIP phone 16 has also logged in to SIP phone 18, and providing registration status and contact information for SIP phone 18, to which SIP phone 14 responds "200 OK".

The call flow and processing in steps 744-776 are substantially the same as that of steps 620-652 of FIG. 8, other than the fact that messages are exchanged between SIP phones 14 and 18, rather than 14 and 16. Essentially, the user of SIP phone 16 causes SIP phone 18 to go busy, and then idle, most likely by placing a call to some third party. SIP phone 18 notifies SIP phone 14 of each change in line status. Recognizing the busy-to-idle transition undergone by SIP phone 18, SIP phone 14 prompts the user of SIP phone 14. The user accepts the call, and a communication session is thereby established between SIP phone 14 and SIP phone 18. The user of SIP phone 14 has thus succeeded in establishing a communication session with the user of SIP phone 16, even though that user had moved to SIP phone 18.

g. Exemplary Call Flow—Calling Party Connected to Called Party

Figure 10:
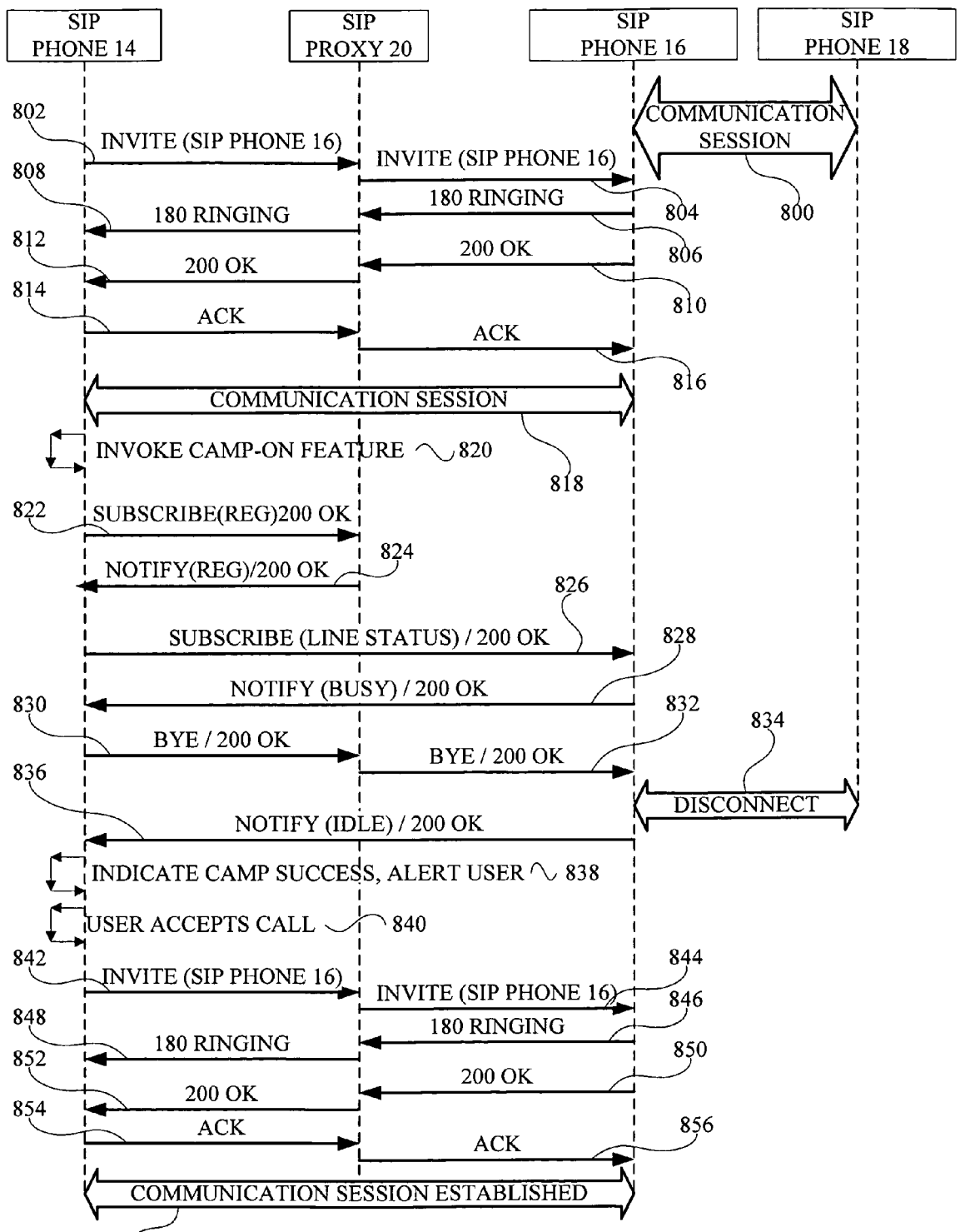
FIG. 10 is a call flow diagram illustrating an exemplary embodiment of the present invention, carried out along the communications system of FIG. 1.

FIG. 10 is a call flow diagram illustrating an exemplary embodiment of the present invention, carried out along the communications system of FIG. 1. In particular, FIG. 10 illustrates a situation where the calling party actually connects with and speaks to the called party, discovers that the called party is already connected on another call to some third party, and then invokes the camp-on feature to later place a second call to the called party.

At 800, SIP 16 is engaged in a communication session with SIP phone 18. At 802 and 804, SIP phone 14 transmits an INVITE request to SIP phone 16. At 806 and 808, SIP phone 16 transmits a "180 Ringing" response to SIP phone 14. At 810 and 812, SIP phone 16 transmits a "200 OK" response to SIP phone 14, indicating that the user of SIP phone 16 has accepted the call from SIP phone 14. At 814 and 816, SIP phone 14 transmits an ACK to SIP phone 16. At 818, a communication session is established between SIP phone 14 and SIP phone 16. In this example, SIP phone 16 is able to accept the call from and engage in a communication session with SIP phone 14 due to having the capability to place the communication session with SIP phone 18 "on hold" while handling the call from SIP phone 14.

At 820, the user of SIP phone 14 invokes the camp-on feature. At 824 and 826, SIP phone 14 subscribes to and receives notification of the registration status and contact information of SIP phone 16. At 826 and 828, SIP phone 14 subscribes to and receives notification of SIP phone 16's line status, which is busy due to the communication session with SIP phone 18. At 830 and 832, SIP phone 16 transmits a BYE message to SIP phone 16, indicating that SIP phone 14 is terminating the communication session established at 818.

At 834, the communication session between SIP phone 16 and SIP phone 18 is terminated. At 836, due to SIP phone 16's change in line status, SIP phone 16 sends a NOTIFY message to SIP phone 14, to which SIP phone 14 responds "200 OK". The call flow and processing in steps 838-858 are substantially the same as that of steps 328-348 of FIG. 5. Essentially, SIP phone 14 prompts the user of SIP phone 14, the user accepts the call, and a communication session is established between SIP phone 14 and SIP phone 16.

h. Unsubscribing to the Line Status of the Called Party

Figure 11:
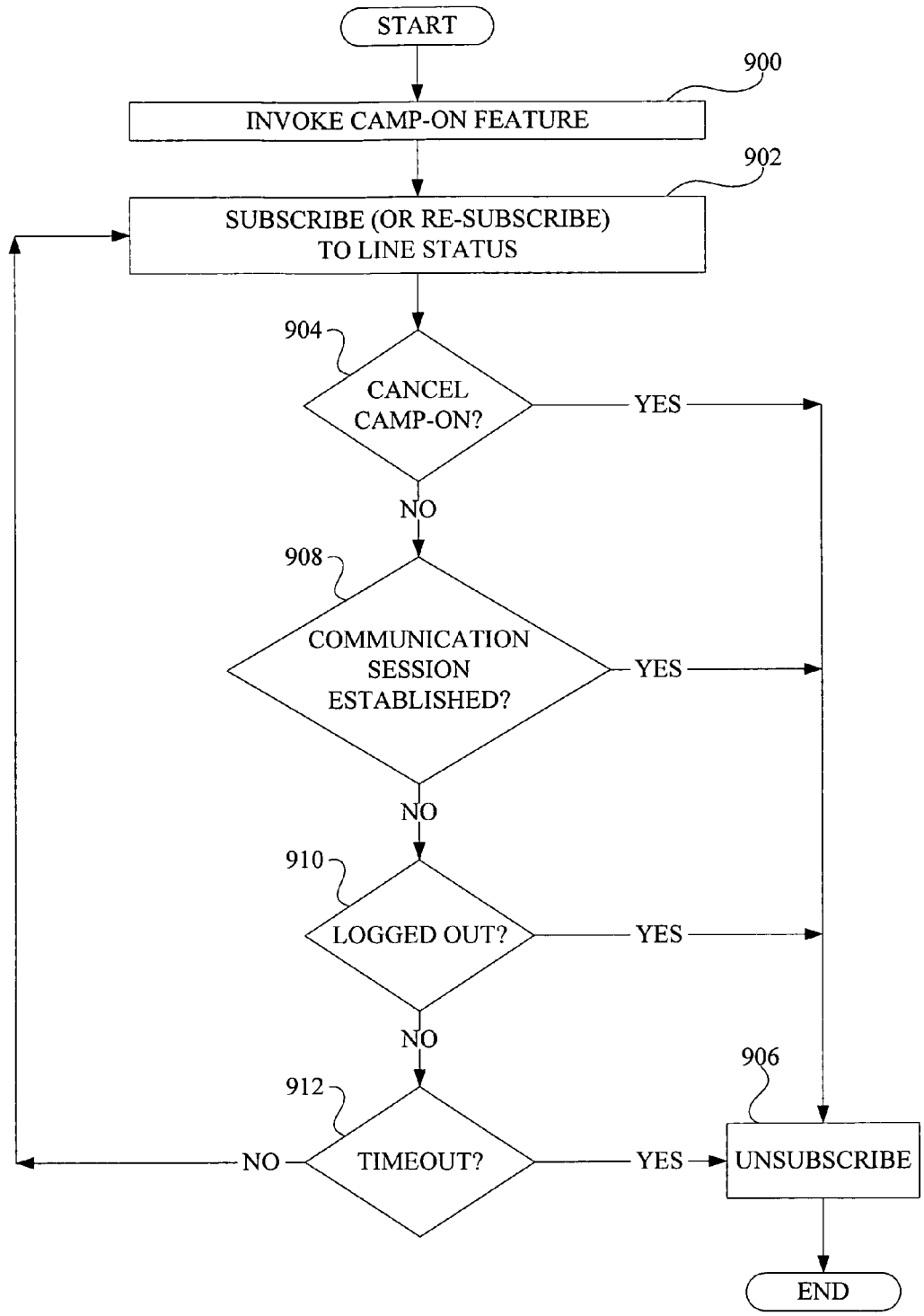
FIG. 11 is a flow chart illustrating an aspect of the present invention.

FIG. 11 is a flow chart illustrating an aspect of the present invention. In particular, FIG. 11 illustrates when one SIP phone, such as SIP phone 14, unsubscribes to the line status of another SIP phone, such as SIP phone 16. As explained above, the use of the SUBSCRIBE request in SIP creates a subscription. The SUBSCRIBE request includes what is known as an "Expires" header, which specifies how long the subscription will last before it will be cancelled, or unsubscribed. If a SIP party wishes to renew a subscription, or "re-subscribe," it may send another SUBSCRIBE request that substantially matches the earlier request.

At 900, the user of SIP phone 14 invokes the camp-on feature. At 902, SIP phone 14 subscribes to the line status of SIP phone 16. At 904, if the user of SIP phone 14 enters a "cancel" command to cancel the camp-on of SIP phone 16, SIP phone 14 unsubscribes, at 906, from the line status of SIP phone 16 by transmitting to SIP phone 16 another SUBSCRIBE request, but with a value of zero in the "Expires" field, or perhaps by using an UNSUBSCRIBE request. This may result in SIP phone 16 responding "200 OK" to SIP phone 14, and notifying SIP phone 14 of SIP phone 16's line status one last time, to which SIP phone 14 may respond "200 OK". Following that exchange, SIP phone 14 will no longer be camped-on SIP phone 16.

If a "cancel" command has not been received, at 908, SIP phone 14 determines whether a communication session has been established with SIP phone 16. This may occur if the camp is a success, in which case the user of SIP phone 14 may be notified of the camp success, accept the call, and establish a communication session with SIP phone 16 (assuming that the user of SIP phone 16 answers the call). A communication session may also be established if the user of SIP phone 14 decides to call SIP phone 16 prior to camp success, which may happen, for example, in a case where the user of SIP phone 16 was away from her desk when the camp-on feature was invoked. In other words, the user of SIP phone 14 may not wait for the camp-on to work. Another possibility is that the user of SIP phone 16 may happen to call the user of SIP phone 14 prior to camp success. However it happens, if a communication session has been established between SIP phone 14 and SIP phone 16, there is no need to continue the camp-on of SIP phone 16, and thus, SIP phone 14 unsubscribes, at 906, from the line status of SIP phone 16.

If no communication session has been established between SIP phones 14 and 16, at 910, SIP phone 14 determines whether the user of SIP phone 14 has logged out of the system. If so, this may be taken as an indication that the user of SIP phone 14 no longer wishes to camp-on SIP phone 16, and thus SIP phone 14 unsubscribes, at 906, from the line status of SIP phone 16. Another possible, though less preferable, implementation would be to unsubscribe SIP phone 14 from the line status of SIP phone 16 if the user of SIP phone 16 logs out of the system, i.e. is not logged in to at least one SIP phone on the network. This programming decision is within the skill of those in the art.

If, however, the user of SIP phone 14 has not logged out of the system, at 912, SIP phone 14 determines whether a timeout period has expired. This timeout period may have different meanings, depending on the implementation. The timeout period may be with respect to the amount of time SIP phone 14 has been camped-on SIP phone 16. It may be desirable to set a maximum camp-on time, to not overload network 12 with messaging. Instead or in addition, a timeout period may apply once the user of SIP phone 14 has been notified that SIP phone 16 has undergone the busy-to-idle transition. If the user of SIP phone 14 does not accept the call with SIP phone 16 within a predetermined period following camp success, this timeout period may expire. However defined, if a timeout period has expired, SIP phone 14 unsubscribes, at 906, from the line status of SIP phone 16. If no timeout period has expired, returning to 902, SIP phone 14 remains subscribed, or re-subscribes if necessary, to the line status of SIP phone 16.

3. Conclusion

Those skilled in the art to which the present invention pertains may make modifications resulting in other embodiments employing principles of the present invention without departing from its spirit or characteristics. The described embodiments are to be considered in all respects only as illustrative, and not restrictive, and the scope of the present invention is indicated by the following claims rather than by the foregoing description.

What is claimed is:

1. A method, comprising:
    a first packet-based device subscribing to a line status of a second packet-based device, such that the second packet-based device responsively notifies the first packet-based device of (i) a current line status of the second packet-based device and (ii) any changes to the line status of the second packet-based device;
    the first packet-based device receiving a first notification from the second packet-based device when the line status of the second packet-based device is in a busy state;
    after receiving the first notification, the first packet-based device receiving a second notification from the second packet-based device when the line status of the second packet-based device is in an idle state;
    responsive to receiving the sequence of the first notification followed by the second notification, the first packet-based device prompting a user of the first packet-based device to establish a communication session with the second packet-based device; and
    after prompting the user, the first packet-based device receiving an accept-call command from the user, and responsively establishing the communication session with the second packet-based device.

2. The method of claim 1, wherein the first packet-based device and the second packet-based device are packet-based telephones.

3. The method of claim 1, further comprising the first packet-based device receiving from the user a camp-on command into the first packet-based device to subscribe to the line status of the second packet-based device, wherein the first packet-based device subscribes to the line status of the second packet-based device in response to receiving the camp-on command.

4. The method of claim 3, wherein the second packet-based device is in the busy state when the camp-on command is received into the first packet-based device.

5. The method of claim 3, wherein the second packet-based device is in the idle state when the camp-on command is received into the first packet-based device.

6. The method of claim 3, wherein the second packet-based device is in a ringing state when the camp-on command is received into the first packet-based device.

7. The method of claim 3, wherein the first packet-based telephone is connected to a voicemail account associated with the second packet-based device when the camp-on command is received into the first packet-based device.

8. The method of claim 3, wherein the second packet-based device is in a logged-out state when the camp-on command is received into the first packet-based device.

9. The method of claim 3, wherein the first packet-based device is engaged in an initial communication session with the second packet-based device when the camp-on command is received into the first packet-based device.

10. The method of claim 2, further comprising the first packet-based device placing an initial telephone call to the second packet-based device.

11. The method of claim 10, further comprising the first packet-based device receiving a called-party-unavailable notification from the second packet-based device, notifying the first packet-based device that the second packet-based device is unavailable to receive the initial telephone call.

12. The method of claim 11, further comprising the first packet-based device notifying the user that the second packet-based device is unavailable to receive the initial telephone call.

13. The method of claim 1, further comprising the first packet-based device:
    subscribing, via a proxy, to a registration status and a contact information of the second packet-based device;
    receiving a first registration notification from the proxy, wherein the first registration notification comprises the registration status and the contact information of the second packet-based device; and
    receiving an updated registration notification from the proxy each time one or both of the registration status and the contact information of the second packet-based device changes, wherein each updated registration notification comprises the registration status and the contact information of the second packet-based device.

14. The method of claim 1, wherein prompting the user of the first packet-based device to establish the communication session with the second packet-based device occurs when the first packet-based device is in a connected state.

15. The method of claim 1, wherein prompting the user of the first packet-based device to establish the communication session with the second packet-based device comprises a visible notification.

16. The method of claim 1, wherein prompting the user of the first packet-based device to establish the communication session with the second packet-based device comprises an audible notification.

17. The method of claim 1, wherein:
    the first packet-based device is a packet-based telephone; and
    the second packet-based device is a packet-based gateway, arranged to mediate communication sessions between (i) one or more packet-based devices in communication with a packet-switched network, and (ii) one or more devices in communication with a circuit-switched telephone network.

18. The method of claim 17, wherein the one or more devices in communication with the circuit-switched telephone network comprise one or more telephones.

19. The method of claim 17, wherein the circuit-switched telephone network is the Public Switched Telephone Network.

20. The method of claim 1, wherein the first packet-based device and the second packet-based device are Session Initiation Protocol telephones.

21. A method comprising:
    a first packet-based device subscribing to a line status of each of multiple packet-based devices, wherein the first packet-based device is not one of the multiple packet-based devices, such that each of the multiple packet-based devices responsively notifies the first packet-based device of (i) a current line status of the respective packet-based device and (ii) any changes to the line status of the respective packet-based device;

the first packet-based device receiving a first notification from a second packet-based device, wherein the second packet-based device is one of the multiple packet-based devices, when the line status of the second packet-based device is in a busy state;

after receiving the first notification, the first packet-based device receiving a second notification from the second packet-based device when the line status of the second packet-based device is in an idle state;

responsive to receiving the sequence of the first notification followed by the second notification, the first packet-based device prompting a first user of the first packet-based device to establish a communication session with the second packet-based device; and after prompting the first user, the first packet-based device receiving an accept-call command from the user, and responsively establishing the communication session with the second packet-based device.

22. The method of claim 21, and further comprising a second user logging in to each of the multiple packet-based devices.

23. The method of claim 21, further comprising the first packet-based device:

subscribing, via a proxy, to a registration status and a contact information of each of the multiple packet-based devices;

receiving a registration notification for each of the multiple packet-based devices from the proxy, wherein each registration notification comprises the registration status and the contact information of a respective one of the multiple packet-based devices; and receiving an updated registration notification from the proxy each time one or both of the registration status and the contact information of any one of the multiple packet-based devices changes, wherein each updated registration notification comprises the registration status and the contact information of the one of the multiple packet-based devices for which the registration status and the contact information changed.

24. The method of claim 21, wherein the first packet-based device and the multiple packet-based devices are packet-based telephones.

25. The method of claim 21, wherein the first packet-based device and the multiple packet-based devices are Session Initiation Protocol telephones.

26. A packet-based telephone, comprising:
a user interface;
a network interface;
a processor; and
a data storage;
wherein the data storage comprises a computer usable medium having control logic stored therein, the control logic comprising computer readable program code executable by the processor for causing the packet-based telephone to:

subscribe the packet-based telephone to a line status of a packet-based device, such that the packet-based device responsively notifies the packet-based telephone of (i) a current line status of the packet-based device and (ii) any changes to the line status of the packet-based device;

receive via the network interface a first notification from the packet-based device when the line status of the packet-based device is in a busy state;

after receiving the first notification, receive via the network interface a second notification from the packet-based device when the line status of the packet-based device is in an idle state;

responsive to receiving the sequence of the first notification followed by the second notification, prompt a user of the packet-based telephone via the user interface to establish a communication session with the packet-based device; and after prompting the user, receive an accept-call command from the user, and responsively establish the communication session with the packet-based device.

27. The packet-based telephone of claim 26, wherein the packet-based telephone and the packet-based device are Session Initiation Protocol telephones.

28. A method, comprising:

a first Session Initiation Protocol (SIP) telephone transmitting a first SIP message, offering a SIP device an invitation to engage in a first communication session with the first SIP telephone;

the first SIP telephone receiving a camp-on command from a user of the first SIP telephone to camp-on the SIP device;

responsive to receiving the camp-on command, the first SIP telephone transmitting a second SIP message to the SIP device, subscribing the first SIP telephone to a line status of the SIP device, such that the SIP device responsively notifies the first SIP telephone of (i) a current line status of the SIP device and (ii) any changes to the line status of the SIP device;

the first SIP telephone receiving a third SIP message from the SIP device, notifying the first SIP telephone that the line status of the SIP device is in a busy state;

after receiving the third SIP message, the first SIP telephone receiving a fourth SIP message from the SIP device, notifying the first SIP telephone that the line status of the SIP device is in an idle state;

responsive to receiving the sequence of the third SIP message followed by the fourth SIP message, the first SIP telephone prompting the user of the first SIP telephone to establish a second communication session with the SIP device;

after prompting the user, the first SIP telephone receiving an accept-call command from the user of the first SIP telephone to establish the second communication session with the SIP device; and the first SIP telephone establishing the second communication session with the SIP device in response to receiving the accept-call command.

29. The method of claim 28, wherein the SIP device is a second SIP telephone.

30. The method of claim 28, wherein the SIP device is a SIP gateway, arranged to mediate communication sessions between (i) one or more SIP devices in communication with a packet-switched network, and (ii) one or more devices in communication with a circuit-switched telephone network.

31. The method of claim 30, wherein the one or more devices in communication with the circuit-switched telephone network comprises one or more telephones.

32. The method of claim 30, wherein the circuit-switched telephone network is the Public Switched Telephone Network.

33. The method of claim 28, further comprising the first SIP telephone receiving a SIP response message from the SIP device in response to transmitting the first SIP message, wherein the SIP response message notifies the first SIP telephone that the SIP device is unavailable to engage in the first communication session.

34. The method of claim 33, wherein the SIP response message notifies the first SIP telephone that the SIP device is in the busy state.

35. The method of claim 33, further comprising the first SIP telephone notifying the user of the first SIP telephone that the SIP device is unavailable to enter into the first communication session.

36. A method, comprising:
a first Session Initiation Protocol (SIP) telephone transmitting a first SIP message, offering a second SIP telephone an invitation to engage in a first communication session with the first SIP telephone;
the first SIP telephone receiving a camp-on command from the user of the first SIP telephone to camp-on the second SIP telephone;
responsive to receiving the camp-on command, the first SIP telephone transmitting a second SIP message to the second SIP telephone, subscribing the first SIP telephone to a line status of the second SIP telephone, such that the second SIP telephone responsively notifies the first SIP telephone of (i) a current line status of the second SIP telephone and (ii) any changes to the line status of the second SIP telephone;
the first SIP telephone canceling the invitation offered by the first SIP message;
the first SIP telephone receiving a third SIP message from the second SIP telephone, notifying the first SIP telephone that the line status of the second SIP telephone is in a busy state;
after receiving the third SIP message, the first SIP telephone receiving a fourth SIP message from the second SIP telephone, notifying the first SIP telephone that the line status of the second SIP telephone is in an idle state;
responsive to receiving the sequence of the third SIP message followed by the fourth SIP message, the first SIP telephone prompting the user of the first SIP telephone to establish a second communication session with the second SIP telephone;
after prompting the user, the first SIP telephone receiving an accept-call command from the user of the first SIP telephone to establish the second communication session with the second SIP telephone; and
the first SIP telephone establishing the second communication session with the second SIP telephone in response to receiving the accept-call command.

37. The method of claim 36, further comprising the first SIP telephone receiving a SIP response message from the second SIP telephone in response to transmitting the first SIP message, wherein the SIP response message notifies the first SIP telephone that the second SIP telephone is in a ringing state.

38. The method of claim 36, wherein the first SIP telephone canceling the invitation offered by the first SIP message comprises the first SIP telephone transmitting a SIP cancel message to the second SIP telephone.

39. A method, comprising:
a first Session Initiation Protocol (SIP) telephone transmitting a first SIP message, offering a second SIP telephone an invitation to engage in a first communication session with the first SIP telephone;
initiating a second communication session between the first SIP telephone and a messaging system, wherein the messaging system maintains an account associated with the second SIP telephone;
the first SIP telephone receiving a camp-on command from the user of the first SIP telephone to camp-on the second SIP telephone;
responsive to receiving the camp-on command, the first SIP telephone transmitting a second SIP message from the first SIP telephone to the second SIP telephone, subscribing the first SIP telephone to a line status of the second SIP telephone, such that the second SIP telephone responsively notifies the first SIP telephone of (i) a current line status of the second SIP telephone and (ii) any changes to the line status of the second SIP telephone;
the first SIP telephone terminating the second communication session;
the first SIP telephone receiving a third SIP message from the second SIP telephone, notifying the first SIP telephone that the line status of the second SIP telephone is in a busy state;
after receiving the third SIP telephone, the first SIP telephone receiving a fourth SIP message from the second SIP telephone, notifying the first SIP telephone that the line status of the second SIP telephone is in an idle state;
responsive to receiving the sequence of the third SIP message followed by the fourth SIP message, the first SIP telephone prompting the user of the first SIP telephone to establish a third communication session with the second SIP telephone;
after prompting the user, the first SIP telephone receiving an accept-call command from the user of the first SIP telephone to establish the third communication session with the second SIP telephone; and
the first SIP telephone establishing the third communication session with the second SIP telephone in response to receiving the accept-call command.

40. The method of claim 39, wherein initiating the second communication session comprises:
a SIP proxy transmitting a SIP cancel message to the second SIP telephone, canceling the invitation offered by the first SIP message; and
the SIP proxy transmitting a SIP invite message to the messaging system, offering the messaging system an invitation to engage in the second communication session.

41. The method of claim 39, wherein initiating the second communication session comprises:
a SIP proxy transmitting a SIP referral message to the first SIP telephone, referring the first SIP telephone to the messaging system; and
the first SIP telephone transmitting a SIP invite message to the messaging system, offering the messaging system an invitation to engage in the second communication session.

42. A method, comprising:
a first Session Initiation Protocol (SIP) telephone transmitting a first SIP message, offering a second SIP telephone an invitation to engage in a first communication session with the first SIP telephone;
the first SIP telephone receiving a second SIP message, notifying the first SIP telephone that the second SIP telephone is unavailable to engage in the first communication session, wherein the second SIP telephone is in a logged-out state;
the first SIP telephone receiving a camp-on command from the user of the first SIP telephone to camp-on the second SIP telephone;
responsive to receiving the camp-on command, the first SIP telephone transmitting a third SIP message a SIP proxy, subscribing the first SIP telephone to a registration status and a contact information of the second SIP telephone;

the first SIP telephone receiving a fourth SIP message from the SIP proxy, notifying the first SIP telephone of the registration status and the contact information of the second SIP telephone, wherein the fourth SIP message indicates that the second SIP telephone is in the logged-out state;

the first SIP telephone receiving a fifth SIP message from the SIP proxy, notifying the first SIP telephone of the registration status and the contact information of the second SIP telephone, wherein the fifth SIP message indicates that the second SIP telephone is in a logged-in state;

responsive to receiving the fifth SIP message, the first SIP telephone transmitting a sixth SIP message to the second SIP telephone, subscribing the first SIP telephone to a line status of the second SIP telephone, such that the second SIP telephone responsively notifies the first SIP telephone of (i) a current line status of the second SIP telephone and (ii) any changes to the line status of the second SIP telephone;

the first SIP telephone receiving a seventh SIP message from the second SIP telephone, notifying the first SIP telephone that the line status of the second SIP telephone is in a busy state;

after receiving the seventh SIP message, the first SIP telephone receiving an eighth SIP message from the second SIP telephone, notifying the first SIP telephone that the line status of the second SIP telephone is in an idle state;

responsive to receiving the sequence of the seventh SIP message followed by the eighth SIP message, the first SIP telephone prompting the user of the first SIP telephone to establish a second communication session with the second SIP telephone;

after prompting the user, the first SIP telephone receiving an accept-call command from the user of the first SIP telephone into the first SIP telephone to establish the second communication session with the second SIP telephone; and the first SIP telephone establishing the second communication session with the second SIP telephone in response in response to receiving the accept-call command.

43. A method, comprising:

a first Session Initiation Protocol (SIP) telephone transmitting a first SIP message, offering a second SIP telephone an invitation to engage in a first communication session with the first SIP telephone;

the first SIP telephone receiving a camp-on command from the user of the first SIP telephone to camp-on the second SIP telephone;

responsive to receiving the camp-on command, the first SIP telephone transmitting a second SIP message, subscribing the first SIP telephone to a registration status and a contact information of the second SIP telephone;

the first SIP telephone receiving a third SIP message, notifying the first SIP telephone of the registration status and the contact information of the second SIP telephone;

the first SIP telephone transmitting a fourth SIP message to the second SIP telephone, subscribing the first SIP telephone to a line status of the second SIP telephone, such that the second SIP telephone responsively notifies the first SIP telephone of (i) a current line status of the second SIP telephone and (ii) any changes to the line status of the second SIP telephone;

transmitting a fifth SIP message to the second SIP telephone, canceling the invitation offered by the first SIP message;

the first SIP telephone receiving a sixth SIP message, notifying the first SIP telephone of the registration status and the contact information of a third SIP telephone, wherein a user of the second SIP telephone is logged in to both the second SIP telephone and the third SIP telephone;

responsive to receiving the sixth SIP message, the first SIP telephone transmitting a seventh SIP message to the third SIP telephone, subscribing the first SIP telephone to a line status of the third SIP telephone, such that the third SIP telephone responsively notifies the first SIP telephone of (i) a current line status of the third SIP telephone and (ii) any changes to the line status of the third SIP telephone;

the first SIP telephone receiving an eighth SIP message from the third SIP telephone, notifying the first SIP telephone that the line status of the third SIP telephone is in a busy state;

after receiving the eighth SIP message, the first SIP telephone receiving a ninth SIP message from the third SIP telephone, notifying the first SIP telephone that the line status of the third SIP telephone is in an idle state;

responsive to receiving the sequence of the eighth SIP message followed by the ninth SIP message, the first SIP telephone prompting the user of the first SIP telephone to establish a second communication session with the third SIP telephone;

after prompting the user, the first SIP telephone receiving an accept-call command from the user of the first SIP telephone to establish the second communication session with the third SIP telephone; and the first SIP telephone establishing the second communication session with the third SIP telephone in response to receiving the accept-call command.

44. A method, comprising:

a first Session Initiation Protocol (SIP) telephone establishing a first communication session with a second SIP telephone;

the first SIP telephone receiving a camp-on command from the user of the first SIP telephone to camp-on the second SIP telephone;

responsive to receiving the camp-on command, the first SIP telephone transmitting a first SIP message from the first SIP telephone to the second SIP telephone, subscribing the first SIP telephone to a line status of the second SIP telephone, such that the second SIP telephone responsively notifies the first SIP telephone of (i) a current line status of the second SIP telephone and (ii) any changes to the line status of the second SIP telephone;

the first SIP telephone receiving a second SIP message from the second SIP telephone, notifying the first SIP telephone that the line status of the second SIP telephone is in a busy state;

the first SIP telephone terminating the first communication session;

after receiving the fourth SIP message, the first SIP telephone receiving a third SIP message into the first SIP telephone from the second SIP telephone, notifying the first SIP telephone that the line status of the second SIP telephone is in an idle state;

responsive to receiving the sequence of the second SIP message followed by the third SIP message, the first SIP telephone prompting the user of the first SIP telephone to establish a second communication session with the second SIP telephone;

after prompting the user, the first SIP telephone receiving an accept-call command from the user of the first SIP telephone to establish the second communication session with the second SIP telephone; and the first SIP telephone establishing the second communication session with the second SIP telephone in response to receiving the accept-call command.

45. The method of claim 44, wherein the second SIP telephone is engaged in a third communication session with a third SIP telephone prior to the first communication session being established.

46. The method of claim 45, wherein the third SIP message is received into the first SIP telephone following termination of the third communication session.

* * * * *